(12) United States Patent
Moran et al.

(10) Patent No.: US 11,867,630 B1
(45) Date of Patent: Jan. 9, 2024

(54) FIXTURE AND METHOD FOR OPTICAL ALIGNMENT IN A SYSTEM FOR MEASURING A SURFACE IN CONTOURED GLASS SHEETS

(71) Applicant: Glasstech, Inc., Perrysburg, OH (US)

(72) Inventors: Benjamin L. Moran, Perrysburg, OH (US); Jason C. Addington, Sylvania, OH (US); Michael J. Vild, Toledo, OH (US)

(73) Assignee: Glasstech, Inc., Perrysburg, OH (US)

( * ) Notice: Subject to any disclaimer, the term of this patent is extended or adjusted under 35 U.S.C. 154(b) by 0 days.

(21) Appl. No.: 17/884,116

(22) Filed: Aug. 9, 2022

(51) Int. Cl.
*G01N 21/958* (2006.01)
*G01N 21/64* (2006.01)

(52) U.S. Cl.
CPC ....... *G01N 21/6456* (2013.01); *G01N 21/958* (2013.01); *G01N 2201/06113* (2013.01)

(58) Field of Classification Search
CPC ............. G01N 21/6456; G01N 21/958; G01N 2201/06113
See application file for complete search history.

(56) References Cited

U.S. PATENT DOCUMENTS

| | | | |
|---|---|---|---|
| 4,746,020 A | 5/1988 | Schenk | |
| 5,243,402 A | 9/1993 | Weber et al. | |
| 5,289,267 A | 2/1994 | Busch et al. | |
| 5,416,589 A | 5/1995 | Lysogorski | |
| 5,438,417 A | 8/1995 | Busch et al. | |
| 5,463,464 A | 10/1995 | Ladewski | |
| 5,465,153 A | 11/1995 | Ladewski | |
| 5,517,575 A | 5/1996 | Ladewski | |
| 5,566,243 A | 10/1996 | Baller et al. | |

(Continued)

FOREIGN PATENT DOCUMENTS

| CN | 101676232 B | 4/2014 |
|---|---|---|
| CN | 103936265 B | 6/2016 |

(Continued)

OTHER PUBLICATIONS

Alexa et al., "Computing and Rendering Point Set Surfaces", IEEE TVCG 9(1), Jan. 2003, 12 pages.

(Continued)

*Primary Examiner* — David P Porta
*Assistant Examiner* — Fani Polyzos Boosalis
(74) *Attorney, Agent, or Firm* — Brooks Kushman P.C.

(57) ABSTRACT

An optical inspection system is provided with a fixture to support a glass sheet, with the fixture having an optical fiducial. An ultraviolet laser and associated optics form a planar laser sheet that intersects a surface of the glass sheet causing the surface to fluoresce and form a visible wavelength line thereon. A camera has an image sensor for detecting the optical fiducial and the visible wavelength line across at least a portion of a width of the sheet. A control system is configured to (i) image the optical fiducial on the fixture, (ii) define an optical fiducial coordinate system from the imaged optical fiducial, (iii) receive a mathematical model of the glass sheet in a model coordinate system, and (iii) relate the optical fiducial coordinate system to the model coordinate system via at least one transformation. A method of using a non-contact optical inspection system is also provided.

28 Claims, 10 Drawing Sheets

(56) References Cited

U.S. PATENT DOCUMENTS

| | | | |
|---|---|---|---|
| 5,680,217 A | 10/1997 | Yli-Vakkuri | |
| 6,226,080 B1 | 5/2001 | Takeuchi et al. | |
| 6,275,286 B1 | 8/2001 | Haubold et al. | |
| 6,392,754 B1 | 5/2002 | Pingel et al. | |
| 6,437,357 B1 | 8/2002 | Weiss et al. | |
| 6,448,549 B1 | 9/2002 | Safaee-Rad | |
| 6,501,546 B1 | 12/2002 | Weiss | |
| 6,509,967 B1 | 1/2003 | Pingel et al. | |
| 6,512,239 B1 | 1/2003 | Weiss et al. | |
| 6,570,651 B1 | 5/2003 | Haubold et al. | |
| 6,633,377 B1 | 10/2003 | Weiss et al. | |
| 7,292,332 B2 | 11/2007 | Gerstner et al. | |
| 7,453,563 B2 | 11/2008 | Rudert et al. | |
| 7,499,812 B2 | 3/2009 | Ersue et al. | |
| 7,554,678 B2 | 6/2009 | Pingel et al. | |
| 7,602,507 B2 | 10/2009 | Ersue et al. | |
| 7,639,349 B2 | 12/2009 | Ersue et al. | |
| 7,796,276 B2 | 9/2010 | Schipke et al. | |
| 7,920,257 B2 | 4/2011 | An et al. | |
| 8,059,151 B2 | 11/2011 | Ersue et al. | |
| 8,064,069 B2 | 11/2011 | Wienand et al. | |
| 8,242,477 B2 | 8/2012 | Lopatin | |
| 8,284,396 B2 | 10/2012 | Rudert | |
| 8,295,585 B2 | 10/2012 | Wienand et al. | |
| 8,427,656 B2 | 4/2013 | Hullin et al. | |
| 8,520,067 B2 | 8/2013 | Ersue | |
| 9,091,533 B2 | 7/2015 | Bachem et al. | |
| 9,470,641 B1 * | 10/2016 | Addington | G01N 21/958 |
| 9,535,002 B2 | 1/2017 | Kubiak | |
| 9,618,671 B2 | 4/2017 | Gaydoul et al. | |
| 9,709,390 B2 | 7/2017 | Luxen et al. | |
| 9,797,833 B2 | 10/2017 | Weigt | |
| 9,818,021 B2 | 11/2017 | Kubiak et al. | |
| 9,992,840 B2 | 6/2018 | Wolfing et al. | |
| 10,289,895 B2 | 5/2019 | Kubiak et al. | |
| 2007/0002313 A1 | 1/2007 | Berg et al. | |
| 2007/0216332 A1 | 9/2007 | Lambert et al. | |
| 2009/0129682 A1 | 5/2009 | Ersue et al. | |
| 2009/0282871 A1 * | 11/2009 | Shetterly | G01N 21/958 702/81 |
| 2011/0057120 A1 | 3/2011 | Ostendarp et al. | |
| 2012/0098959 A1 | 4/2012 | Addington | |
| 2015/0070487 A1 | 3/2015 | Agbuga | |
| 2015/0109615 A1 | 4/2015 | Muller et al. | |
| 2015/0085080 A1 | 5/2015 | Hollenbeck et al. | |
| 2017/0124715 A1 | 5/2017 | Tin | |
| 2018/0209918 A1 | 7/2018 | Tarantino | |
| 2019/0082516 A1 | 3/2019 | Wolfing et al. | |
| 2019/0178816 A1 | 6/2019 | Kubiak et al. | |

FOREIGN PATENT DOCUMENTS

| | | |
|---|---|---|
| DE | 10061070 A1 | 6/2002 |
| DE | 4301546 C2 | 8/2002 |
| DE | 10045105 C2 | 9/2002 |
| DE | 10111729 A1 | 9/2002 |
| DE | 20307305 U1 | 7/2003 |
| DE | 102004005019 A1 | 8/2005 |
| DE | 202005003352 U1 | 7/2006 |
| DE | 102005009606 A1 | 8/2006 |
| DE | 102005010552 B4 | 1/2007 |
| DE | 19511707 B4 | 9/2007 |
| DE | 10104355 B4 | 2/2010 |
| DE | 202009017763 U1 | 5/2010 |
| DE | 102010021853 B4 | 4/2012 |
| DE | 102015105128 A1 | 10/2016 |
| DE | 102018108874 A1 | 10/2019 |
| EP | 0763406 B1 | 2/2000 |
| EP | 0911603 B1 | 6/2001 |
| EP | 0747664 B1 | 8/2001 |
| EP | 2363684 A1 | 9/2011 |
| EP | 2691799 B1 | 8/2020 |
| FR | 2975776 A1 | 5/2011 |
| WO | 2006092320 A2 | 9/2006 |
| WO | 2010096890 A1 | 9/2010 |
| WO | 2012098430 A1 | 7/2012 |
| WO | 2015155070 A1 | 10/2015 |
| WO | 2015169730 A1 | 11/2015 |

OTHER PUBLICATIONS

Fleishman et al., "Bilateral Mesh Denoising", School of Computer Science, Tel Aviv University, 2003, 4 pages.

International Preliminary Report for PCT Application No. PCT/US2019/043180, dated Feb. 4, 2021, 10 pages.

International Search Report and Written Opinion for PCT Application No. PCT/US2019/043180, dated Oct. 15, 2019, 11 pages.

Jones et al., "Non-Iterative, Feature-Preserving Mesh Smoothing", ACM SIGGRAPH, 2003, 7 pages.

Lancaster et al., "Surfaces Generated by Moving Least Squares Methods", Mathematics of Computation, vol. 37, No. 155, Jul. 1981, 18 pages.

Liu et al., "Automatice least-squares projection of points onto point clouds with applications in reverse engineering", Computer-Aided Design 38, 2006, pp. 1251-1263.

Miyazaki, "Measuring Surface Shape of Transparent Objects Based on the Analysis of Polarization, Thermal Radiation and Geometrical Property", A Master Thesis, Graduate School of the University of Tokyo, Feb. 5, 2002, 83 pages.

Rantoson et al, "Optimization of transparent objects digitization from visible fluorescence UV-induced", Optical Engineering, Mar. 2012, 16 pages.

Fleishman et al., "Robust Moving Least-squares Fitting with Sharp Features", 2005, 9 pages.

Taubin, "A Signal Processing Approach to Fair Surface Design", IBM T.J. Watson Research Center, 1995, 8 pages.

Xu et al., "A geometry and optical property inspection system for automotive glass based on fringe patterns", Optica Applicata, vol. XL, No. 4, 2010, 15 pages.

Yagou et al., "Mesh Smoothing via Mean and Median Filtering Applied to Face Normals", Proceeding of the Geometric Modeling and Processing—Theory and Applications, 2002, 8 pages.

Zhao et al., "Parameters influence of windshield curvature on pedestrian head injuries based on reverse engineering", IOP Conf. Series, Journal of Physics, Series 1213, 2019, 7 pages.

European Extended Search Report for Application No. 19839886.9, dated Feb. 25, 2022, 8 pages.

International Search Report and Written Opinion for Application No. PCT/US2023/028969, dated Sep. 18, 2023, 6 pages.

* cited by examiner

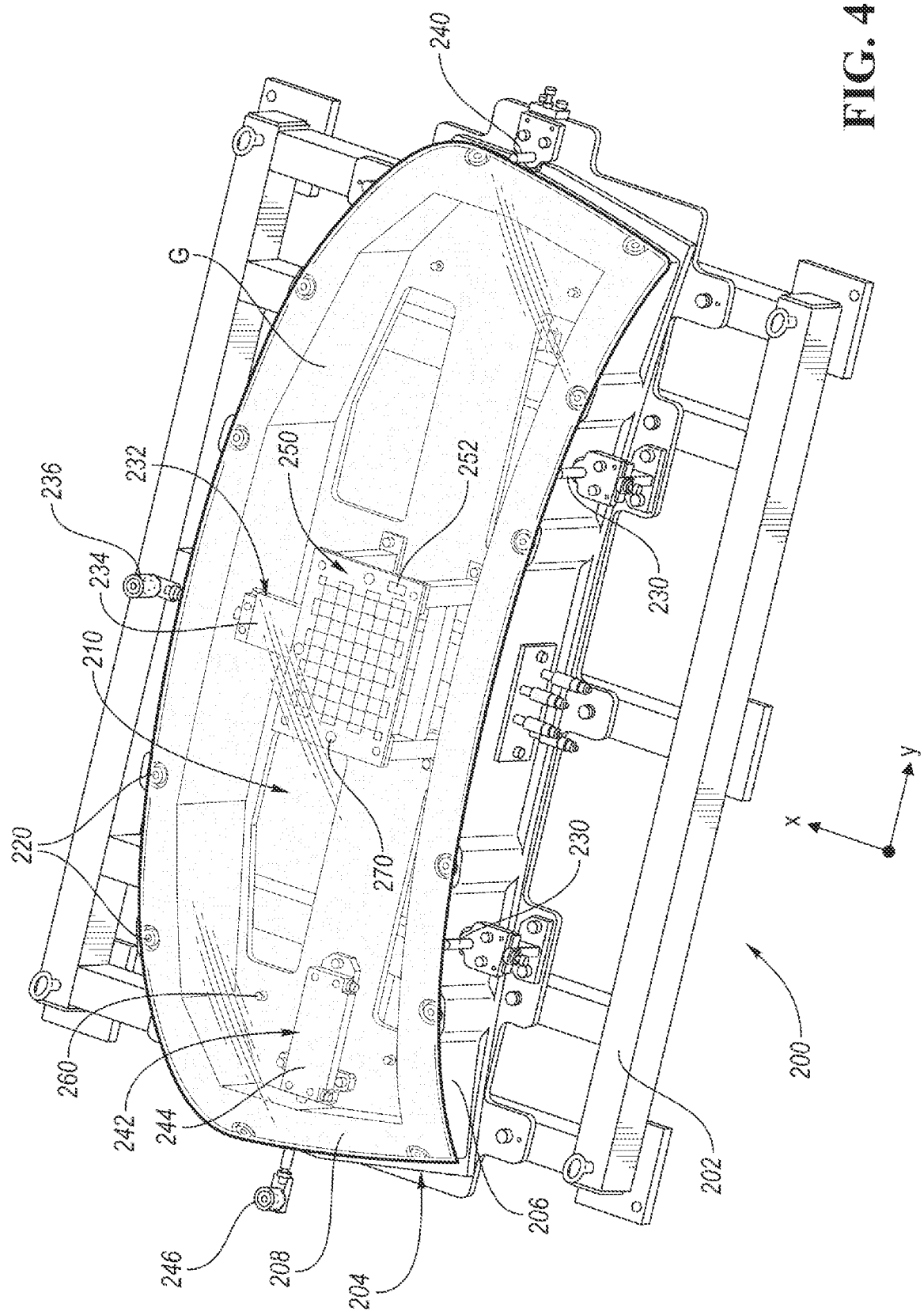

COORDINATE SYSTEM VIA 3 (NON-COLINEAR)
POINTS SUCH AS FOR A PHYSICAL FIDUCIAL:

COORDINATE SYSTEM VIA
CHECKERBOARD AS AN OPTICAL FIDUCIAL:

FIXTURE AND METHOD FOR OPTICAL ALIGNMENT IN A SYSTEM FOR MEASURING A SURFACE IN CONTOURED GLASS SHEETS

TECHNICAL FIELD

Various embodiments relate to a fixture and method for use of the fixture with a system for optically measuring a surface of a contoured glass sheet.

BACKGROUND

Manufacturers of glass sheets, particularly glass sheets formed into various curved shapes for use as automotive windshields, backlites, and sidelites, are interested in measuring and evaluating the surface of a glass sheet. Manufacturers may desire to determine if the glass sheet is within a predefined specification for gauging. Manufacturers may also desire to measure and evaluate an amount of reflected optical distortion in the formed sheets that might be perceived by a human observer, such as an outside observer or the operator or passenger in a vehicle in which the glass may be mounted as the windshield, backlite, or sidelite, or the like. For example, gauging metrics and reflected distortion thresholds are becoming tighter and tighter with the increased use of technology such as heads up displays in vehicle applications.

As a part of measuring or gauging a glass sheet, the location of the glass sheet within scanning system may need to be determined. Use of a conventional glass sheet support fixture may not work with optical inspection systems employing non-contact measurements or gauging, and the optical inspection system may be unable to precisely and/or accurately locate the glass sheet without use of a calibrated fixture.

BRIEF DESCRIPTION OF THE DRAWINGS

FIG. 4 illustrates a perspective view of the fixture of FIG. 3 with a glass sheet;

DETAILED DESCRIPTION

As required, detailed embodiments of the present disclosure are provided herein; however, it is to be understood that the disclosed embodiments are merely examples and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

Figure 1:
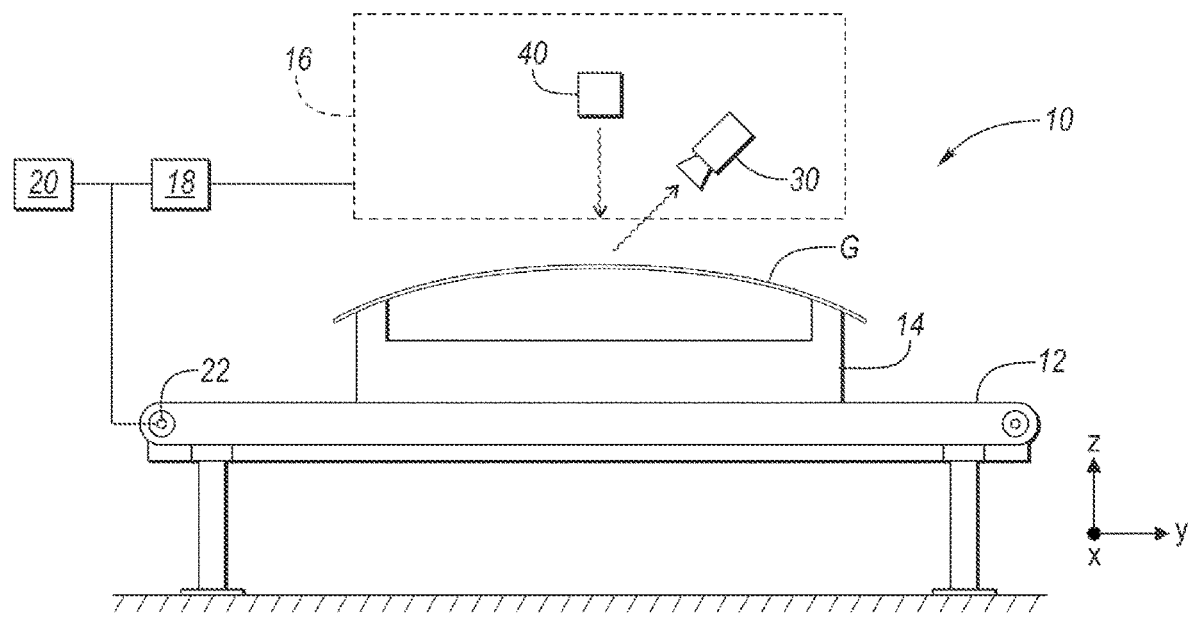
FIG. 1 illustrates a schematic view of an embodiment of a glass sheet inspection system according to an embodiment.

FIG. 1 illustrates an on-line glass sheet optical inspection system 10. An example of a sub-system for use with the system 10 and fixture 14 of the present disclosure is described in PCT Patent Application Serial No. PCT/US19/43180 filed on Jul. 24, 2019 and entitled "System And Method For Measuring A Surface In Contoured Glass Sheets", the disclosure of which is incorporated by reference in its entirety herein. In other examples, other non-contact optical inspection systems may be used with the present disclosure.

The inspection system 10 includes a conveyor 12 which conveys the glass sheet G, also referred to as a glass panel G, in a first direction generally parallel to a first dimension of the glass sheet. In the example shown, the contoured glass sheet G is a generally trapezoidal vehicle windshield or backlight, having a first dimension which is the relatively smaller dimension (and which may alternatively be referred to as the height) and a second, relatively larger dimension (which may alternatively be referred to as the width). The glass sheet G has a thickness in the third dimension, with the thickness being smaller than the width and the height. The glass sheet G is curved about one or more axes of curvature that are generally parallel to the first direction. In other examples, the glass sheet G may have other axes of curvature, be provided as a flat or substantially flat sheet, or be otherwise shaped.

The conveyor 12 may be a single conveyor dedicated solely to transporting the glass sheet G through the inspection system 10 which may be configured and/or operated as a stand-alone optical inspection system. In other examples, the conveyor 12 may be one of a series of conveyors which convey the glass sheet through a variety of process stations, such as, for example, heating, forming, and annealing or tempering stations found in a typical automotive, architectural and/or solar glass sheet fabrication systems. The conveyor for the glass sheet G may be provided by various techniques such as by roller, air-float, or belt conveyors, positioners, and robotic arms, in order to handle the glass in the manner described. It will also be appreciated that a plurality of conveyors, each of which may be independently controlled to move the glass sheets through the different processing stations at speeds to efficiently govern the flow and processing of the glass sheets throughout system 10. Alternatively, the inspection system 10 may be provided as a separate, stand-alone system or apparatus without a conveyor.

The inspection system 10 may also be provided with a fixture 14 for the glass sheet G. The fixture 14 supports and locates the glass sheet G thereon. The fixture 14 may provide for precise and accurate positioning of the glass sheet G. A fixture for use with the system of FIG. 1 is described in greater detail below with reference to FIGS. 3-4 and FIGS. 7-9.

An inspection sub-system 16 may be configured to translate relative to the sheet G and fixture 14, e.g. with the inspection sub-system 16 mounted on a conveyor system and/or with the fixture 14 mounted on a conveyor system 12. The inspection sub-system 16 has optical elements configured to scan the surface of the glass sheet G based on the motion of the inspection sub-system 16 relative to the fixture 14.

The inspection sub-system 16 may be used to measure the surface of a glass sheet, and may be further used to gauge the sheet, measure small surface curvature defects in the sheet, and/or measure reflective optical distortion. An inspection sub-system 16 according to one example and for use with the system 10 and fixture 14 of FIG. 1 is described with reference to FIGS. 1A.

According to one example, the inspection sub-system 16 is a non-contact optical system, and has one or more cameras or other detectors to image or otherwise detect light used to measure and/or gauge the glass sheet G. In the example shown, the inspection system 16 may detect light at a visible wavelength or non-visible wavelength, e.g. in the ultraviolet or infrared wavelength ranges.

Figure 1A:
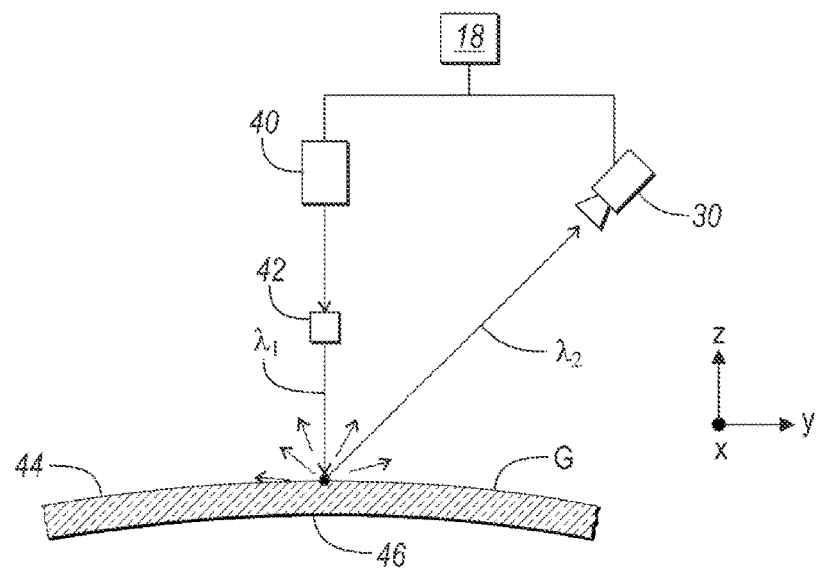
FIG. 1A illustrates a schematic view of an optical inspection sub-system for use with the glass sheet inspection system of FIG. 1.

With reference to FIGS. 1 and 1A, and according to a further, non-limiting example, the sub-system 16 includes a detector 30 such as a camera, and a light source 40, such as a laser or the like. The detector 30 may be provided by a single camera or by multiple cameras that image different regions of the glass sheet G. In a multi-camera system, the regions imaged by the cameras may be overlapping or non-overlapping. According to one example, the sub-system 16 has a laser 40 or other light source with a wavelength selected at least in part based on the optical properties of the glass sheet G. The light source may output light at a visible or non-visible wavelength, e.g. in the ultraviolet or infrared wavelength ranges. Light from the light source 40 is directed to the glass sheet G by the sub-system 16. In one example, the light source is selected to have a wavelength $\lambda_1$ in a tuned, narrow band to which that glass sheet G is opaque or generally non-transmissive. The light source 40 is also selected such that the wavelength $\lambda_1$ of the light source induces or causes the surface of the glass sheet G to emit light at a wavelength $\lambda_2$ that is different than the light source. For example, the light source 40 is selected such that the wavelength $\lambda_1$ of the light source induces or causes the surface of the glass sheet G to fluoresce or luminesce at a wavelength $\lambda_2$ that is longer than the wavelength $\lambda_1$ of the light source. In a further example, the laser 40 is a pulsed diode laser that is tuned to provide ultraviolet light at a specific wavelength to which the glass sheet G is opaque or non-transmissive, or to which the glass sheet G is substantially non-transmissive, e.g. with less than 5% or 2% transmissivity for the laser output, while the glass sheet fluoresces in the visible spectrum.

The sub-system 16 may also include various optical elements 42 to control and direct light from the light source to the glass sheet G, and from the glass sheet G to the detector. The optical elements 42 may be configured to provide a planar laser sheet to one surface 44 of the two surfaces 44, 46 of the glass sheet G. The planar laser sheet may extend transversely across the conveyor, e.g. in the x-direction. The first and second surfaces 44, 46 are spaced apart from one another by the thickness of the glass sheet G. As the glass sheet G is opaque or substantially non-transmissive to the wavelength $\lambda_1$ of the laser sheet, the laser sheet interacts with the first surface 44 without traveling through the sheet G or to the second surface 46, and therefore excites the glass sheet G only at the first surface 44, such that a visible line of light at the wavelength $\lambda_2$ appears on the surface 44. This emitted line of light is detected by the camera(s) 30 for the system 10.

The camera 30 may be provided with a charge-coupled device (CCD) image sensor or a complementary metal-oxide semiconductor (CMOS) image sensor. In the present example, the detector 30 is provided with a CMOS sensor and is positioned such that the entire width of the glass sheet G, or glass sheet in the x-direction is captured in an image. In the example shown, the camera is provided by a CMOS sensor camera at 5496×3672 pixels that is set to a region of interest of 5496×1836 or 5496×1000 pixels in one example, or is a CMOS sensor at 5120×5120 pixels in another example. Various camera settings may be controlled based on the laser parameters, conveyor speed, and other system factors, and these camera settings include lens focal length, aperture, gain, and exposure times. In one example, the camera uses a fixed lens, e.g. a 16 mm or 25 mm lens, and is set to an f2.4 aperture or higher apertures for increased depth of field, and uses an exposure time of 15-20 milliseconds with a gain of 2-15 decibels. In another example, the camera settings may use another exposure time, e.g. within a range of 10 milliseconds to 300 milliseconds or more, and the gain may likewise be set to another value within a range of two to thirty decibels. In other examples, the camera 30 may be positioned to image only a selected region of the sheet G. In further examples, the detector may be provided as another photodetector or photosensing element. In further examples, additional optical elements, such as filters, may be provided between the glass sheet G and the detector 30 to further increase the signal-to-noise ratio.

The sub-system 16 has at least one computer and/or control unit 18 that includes at least one processor program to execute logic for controlling the optical system, including the detector(s) and any light source(s), acquiring data from the detector(s) for each glass sheet, analyzing the data for the glass sheet, and providing information related to the surface shape, reflective optical distortion, or other surface information or defects for the glass sheet. The computer may be integrated with a control system 20 for the inspection system 10 as shown, or may be provided as a separate device in communication with the control system 20. The control system 20 may include a programmable control unit, or a computer to detect the glass sheet as it advances on the conveyor, and control the movement and speed of the conveyor 12.

The optical sub-system 16 therefore provides a non-contact inspection system for rapidly acquiring detailed data corresponding to the surface of a glass sheet G and analyzing the acquired surface data to assess and report on the surface shape of the glass sheet G as well as properties related to the optical characteristics of the glass sheet G, for example, as the glass sheet G is being transported on a conveyor 12 between or after bending, cooling, or other processing operations with sufficient time to scan and analyze the sheet G, or to provide measurement or gauging of the glass sheet G or a surface thereof The conveyor 12 moves the fixture 14, with or without a glass sheet G, along a path or in a direction, shown here as the y-direction, past the optical system 16. The conveyor 12 is moved using one or more motors and support rollers or other devices.

The inspection system 10 has one or more position sensors 22 to determine a location and timing of the conveyor 12 for use in analyzing the glass sheet G using the sub-system 16, and for calibrating the sub-system 16 using the fixture 14. The position sensor(s) 22 may be provided by a digital encoder, an optical encoder, or the like. The position sensors 22 may be used as an input to the optical system 16 to determine timing for data acquisition, e.g. as a trigger for a camera.

The inspection system 10 may be provided with additional sensors, such as a photoelectric sensor or the like, in communication with the control system 18, 20 to determine that a fixture 14 or glass sheet G is in the appropriate position on the conveyor 12, or has advanced to the sub-system 16. The computer 18, 20 then communicates with the sub-system 16 to activate the system 10 and begin measuring a surface of the sheet G. In other examples, the optical system 16 may be continuously operating and begin acquiring and processing data related to a glass sheet G in response to the system 10 detector registering appropriate signals indicating that the light source has begun to interact with the glass sheet G.

In use, the system 10 may measure or gauge a glass sheet G by use of the light source 40 and the cameras 30. The system 10 may scan and image the glass sheet G, and create a three-dimensional map or point cloud of the surface of the glass sheet G.

For measuring or gauging a glass sheet G, the computer 18 receives image data from the camera 30 as a series of data indicative of a series of visible wavelength lines as measured or detected using one or more cameras, with each camera imaging a region of interest of the glass sheet G. Each visible wavelength line is processed and analyzed to determine first and second coordinates, e.g. (x, y) coordinates for the surface of the glass sheet, in a series of coordinates associated with each line, and the coordinates are stored in a matrix or point cloud associated with the camera. A third coordinate, such as a (z) coordinate, is calculated by the computer 18 using triangulation from a position of the laser, a position of the camera, and the first and second coordinates, and the (z) coordinate is stored in the matrix or point cloud.

The computer 18 forms the matrix or point cloud using data from the image, e.g. cells in the matrix associated with positions on the surface 44 of the glass sheet, or as an array of points in the point cloud associated with positions on the surface 44 of the glass sheet. A three-dimensional map of the surface of the glass sheet may then be created from the matrix or point cloud as a function of the series of coordinates for each of the series of visible wavelength lines for a glass sheet G for the camera. As the laser light does not pass through the glass sheet G, only the surface 44 facing the inspection system luminesces. As such, the point cloud with series of coordinates provides a three-dimensional, high resolution, mathematical model of the surface 44 of the glass sheet G by way of the series of (x, y, z) coordinates.

Prior to measuring or gauging the glass sheet G to create the point cloud or map of the surface 44, the system 10 may need to be calibrated in order to link the point cloud to a known coordinate system. The present disclosure is directed to a fixture and a method to provide such a calibration for the system 10.

Figure 2:
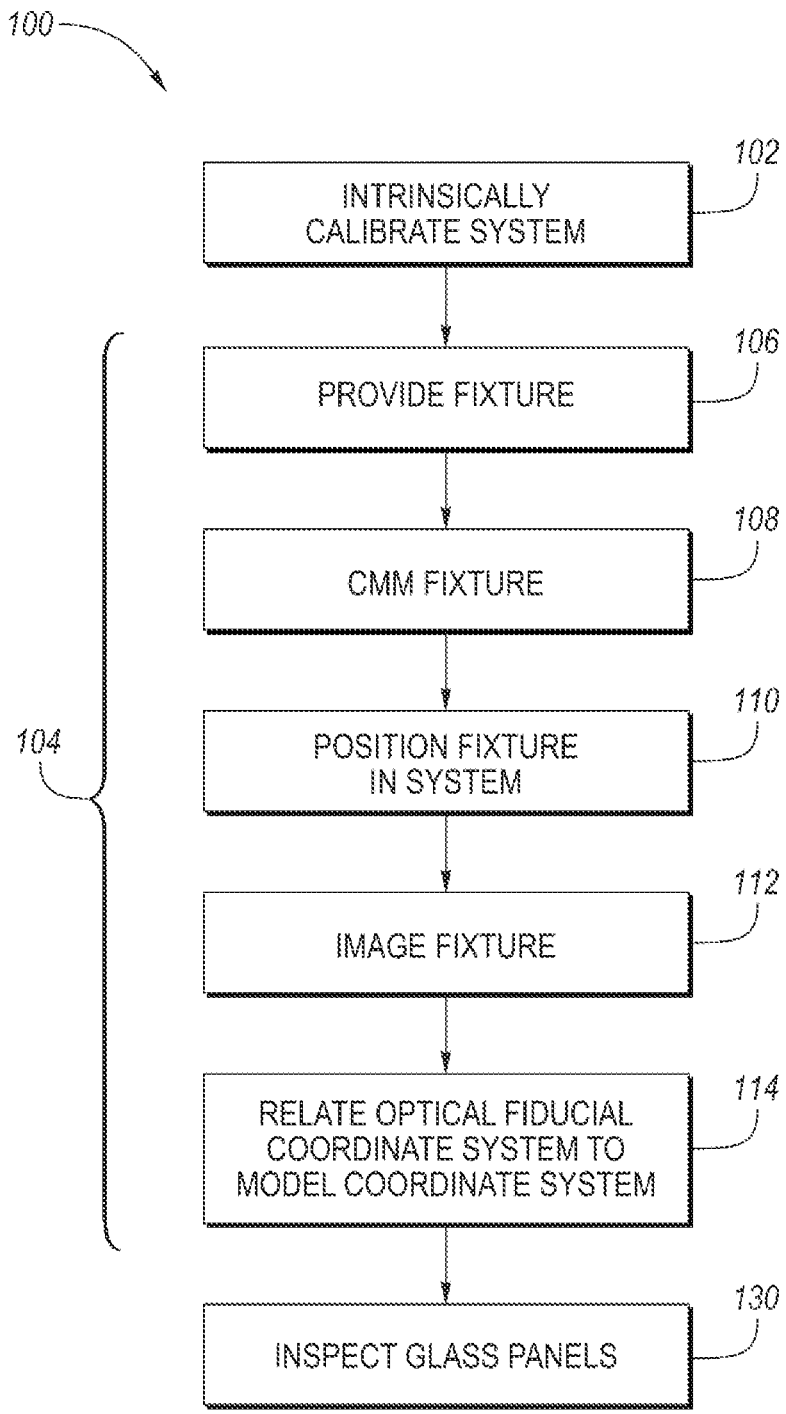
FIG. 2 illustrates a flow chart of a method of optically aligning a fixture for measuring a glass sheet using the optical inspection system of FIG. 1.

FIG. 2 illustrates a flow chart of a method 100 for calibrating an optical inspection system according to an embodiment. For method 100, steps may be rearranged or omitted or additional steps may be added according to various embodiments.

At step 102, the subsystem 16 may be intrinsically calibrated, e.g. the camera, the light source, and the conveyor 12 may be each calibrated.

The system 10 is extrinsically calibrated via one or more steps associated with 104.

Figure 3:
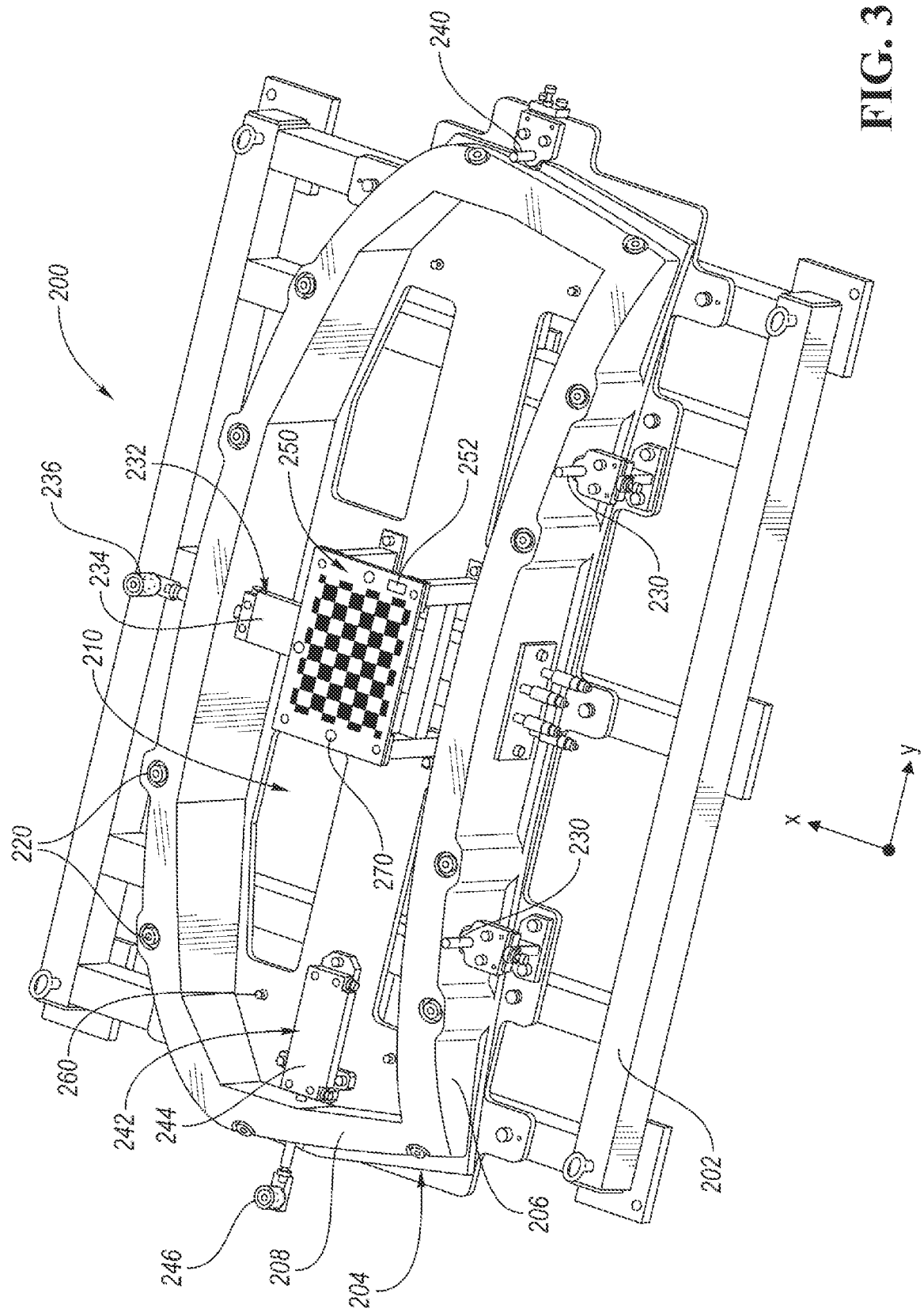
FIG. 3 illustrates a perspective view of a fixture for use with the inspection system of FIG. 1 according to an embodiment and without a glass sheet.
Figure 9:
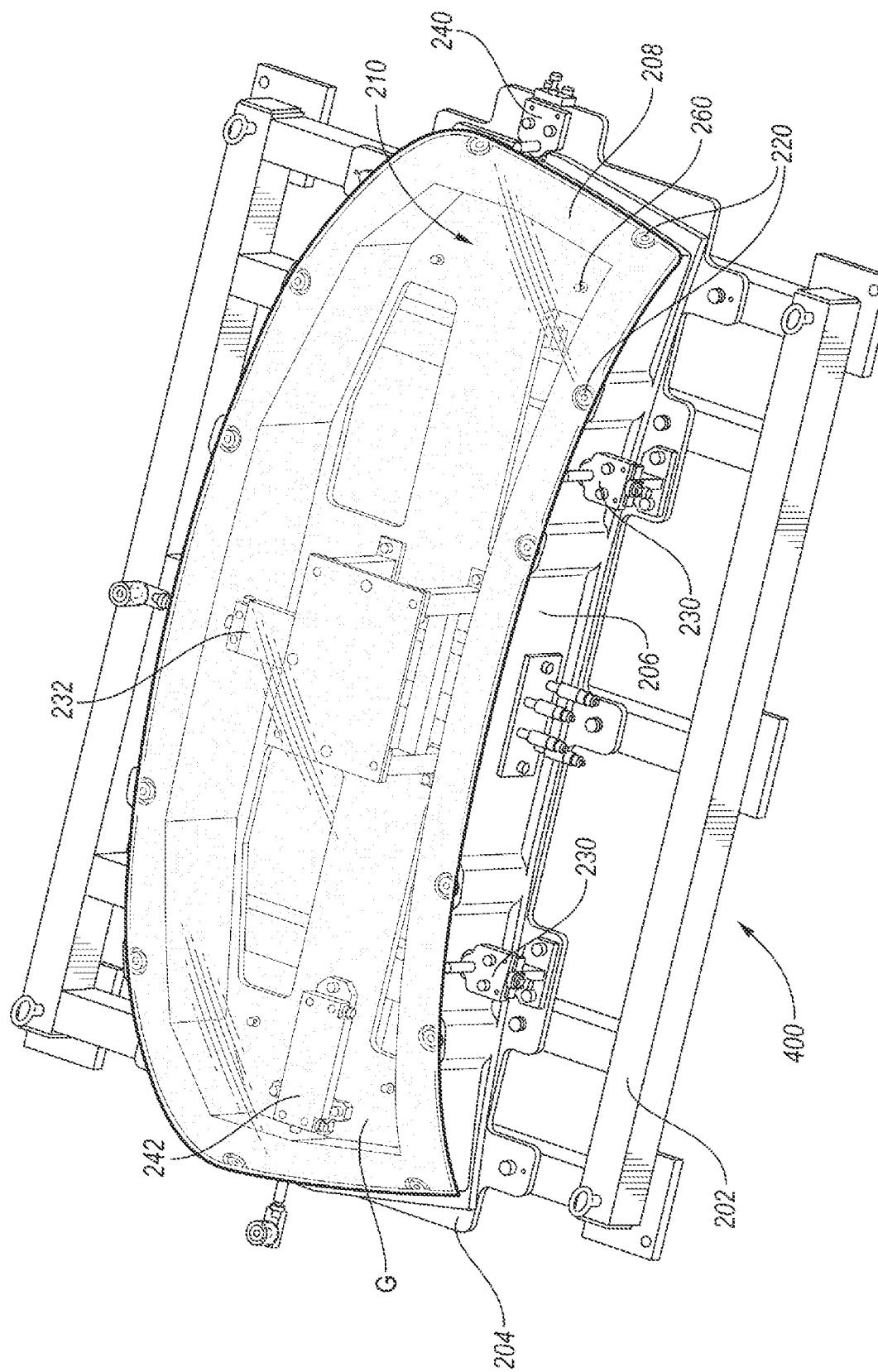
FIG. 9 illustrates a perspective view of a fixture for use with the inspection system of FIG. 1 and method of FIG. 2 according to yet another embodiment.

At step 106, a fixture for use with system 10 is provided. An example of a fixture 200 is shown in FIG. 3 without a glass sheet G, and in FIG. 4 with a glass sheet G. Another example of a fixture 300 is shown in FIG. 7 without a glass sheet G, and in FIG. 8 with a glass sheet G. Fixture 400 is shown in FIG. 9. Fixture 200, 300 or 400 may be provided as fixture 14 in FIG. 1. Each fixture is described below in greater detail.

With reference to FIGS. 3 and 4, the fixture 200 has an underlying frame 202. The frame may be supported on the conveyor of the system, and may be used to lift or otherwise move the fixture. The frame 202 is provided with a fixture frame 204. In the example shown, the fixture frame has a side wall 206 that extends upwardly from the frame to an upper surface 208. The side wall may be shaped substantially similar to a an outer perimeter of the glass sheet G intended for use with the fixture. The upper surface 208 of the side wall may be contoured or otherwise shaped to follow the a surface, such as a lower surface 46, of the glass sheet G. The side wall may extend continuously about an open central region 210.

A series of standoff pins 220 are provided that extend upwardly from the upper surface 208. The series of standoff pins are spaced apart from one another about the upper surface of the side wall. The standoff pins are provided to contact and support the glass sheet on the fixture. The series of standoff pins may define an A datum for the fixture. When a sheet G is supported on the fixture, the lower surface 46 of the sheet is spaced apart from the upper surface 208 of the side wall such that the lower surface of the sheet does not contact the upper surface of the fixture, and is only supported by the standoff pins.

The exact shape, size, and surface shape and contour of an actual glass sheet G may differ from a glass sheet as defined in a CAD or other mathematical model of the sheet. As such, the actual glass sheet G may not be in contact with each and every one of the standoff pins 220 based on variability in the glass sheet G. For a fixture with more than three standoff pins, and a possible deviation of the actual sheet G from a mathematical or CAD modelled sheet, the system and fixture may be over-constrained. More than three standoff pins may be necessary to fully support the glass sheet on the fixture, as shown. In the example shown, there are twelve standoff pins, however a greater or fewer number of standoff pins is also contemplated. In this scenario, any measurement data taken by the sub-system 16 of the glass sheet G may not be used to directly align the sub-system 16 point cloud of the surface of the sheet G to the CAD data, as the needed assumption that all of the standoff pins 220 are in contact with the glass sheet G may introduce error into locating the glass sheet.

The fixture 200 may also be provided with additional datums to locate the edge of the sheet G relative to the fixture. In the example shown, the fixture has a pair of B datum posts 230, and an associated B datum mechanism 232 to draw the edge of the glass sheet G into contact with the B datum posts. The B datum posts may locate the edge of the sheet G with respect to the x-axis of the fixture. The B datum mechanism may be provided with a pneumatic or other operated cylinder 234 and arm 236. The arm 236 contacts the edge of the sheet opposite to the B datum posts and translates the sheet G along the x-axis until the sheet is in contact with the B datum posts. In other examples, there may be one B datum post.

In the example shown, the fixture also has a C datum posts 240, and an associated C datum mechanism 242 to draw the edge of the glass sheet G into contact with the C datum post. The C datum post may locate the edge of the sheet G with respect to the y-axis of the fixture. The C datum mechanism may be provided with a pneumatic or other operated cylinder 244 and arm 246. The arm 246 contacts the edge of the sheet opposite to the C datum post and translates the sheet G along the y-axis until the sheet is in contact with the C datum post. In other examples, there may be two C datum posts.

While the standoffs 220 and B and C datum posts 230, 240 allow for exactly locating the glass sheet G relative to the fixture 200, when the glass sheet G is imaged in the system 10, the sub-system 16 may be unable to precisely define or find an edge or boundary of the glass sheet with a high degree of accuracy and precision. For example, there may be an error introduced into a measurement of the edges, or the exact location of the edges, in the point cloud for the glass sheet G based on errors and artifact points created by the light source 40 interacting with the surface 44 and edges of the sheet G. One example of an edge effect or bias in their measured location is that caused by a laser beam steering effect, and/or a bias in a calculated line center of fluoresced line from a laser sheet onto the surface of the sheet G. These effects or biases may create artifact points in the three-dimensional point cloud and introduce error in locating of the edge of the sheet using the system 10. As this is a non-contact inspection system 10, and a definitive edge for the sheet G may be unable or difficult to be accurately and precisely defined using the three dimensional point cloud data, calibrating and aligning the fixture to provide a relative coordinate system for the system 10 remains important. As such, the fixture 200 is otherwise aligned and calibrated using the system 10 in order to compare the system sheet G surface data of the three dimensional point cloud to the mathematical or CAD model to measure or gauge the sheet, or to compare the alignment data for the fixture 200 to the CMM coordinate system and CAD model to validate the fixture alignment and coordinates and/or to measure or gauge the sheet.

The fixture 200 is therefore provided with an optical fiducial 250, e.g. a checkerboard chart or other known, planar calibration surface 250. In the example shown, the optical fiducial 250 is provided as a calibration surface within the open region 210 surrounded by the side wall of the fixture. The calibration surface may be positioned beneath the upper surface of the side wall such that the calibration surface remains on the fixture regardless of the presence of a glass sheet G. The calibration surface may be positioned to be close to the elevation of an adjacent glass sheet G. The optical fiducial 250 is positioned relative to the upper surface of the side wall such that the side wall does not obstruct a portion of the optical fiducial from the field of view of an associated camera. In another example, the optical fiducial may be removable from the fixture, and only positioned on the fixture for alignment and calibration purposes, and not while the system 10 is imaging a glass sheet G. In another example, the optical fiducial may be covered to protect it while the system 10 is measuring the glass sheet G.

In one example, the optical fiducial or calibration surface 250 is provided with a known number and size of checkboard squares. The calibration surface may be connected to the fixture at a known location and at a known angle, or may be generally positioned within the fixture, and a relation between the checkerboard and fixture coordinates determined later. In the example shown, the calibration surface 250 is centrally located in the fixture, and is formed as a planar or flat surface. While the calibration surface 250 is flat, the calibration surface may be tilted or at an angle relative to the fixture and/or relative to the camera viewing angle.

The optical fiducial 250 may be provided with a visual marker 252 or indicator to allow for recognition of the fixture by the system 10. For example, the visual indicator may be a bar code, such as a two-dimensional or three-dimensional bar code, or other visual indicator or label.

The optical fiducial 250 may also have three or more physical fiducials 270, such as fiducial markers to relate the position and alignment of the optical fiducial 250 to the physical fiducials 260 of the fixture 200.

In one example, an entirety of the optical fiducial 250, e.g. the checkerboard, is positioned to be visible to all of the cameras 30 or detectors of the system for a system with one or more cameras. In another example, and for a system 10 with multiple cameras and multiple optical fiducials 250, each optical fiducial may be positioned such that it is within an entirety of a field of view of an associated camera, with the system applying an additional transformation to stitch or otherwise cross-reference multiple camera data together when creating the calibration and fixture alignment.

The fixture 200 may be provided with physical fiducials 260, e.g. tooling balls 260 or other CMM surfaces such as edges or apertures. The physical fiducials 260 may be used to correlate CMM coordinates and data with system calibration and alignment data from the optical fiducial 250 and from the fixture 200. In the example shown, the fixture 200 has three or more physical fiducials 260. The fixture may also have physical fiducials 270 on the calibration table, such as physical fiducial markers, to relate position and alignment of the optical fiducial 250 to the remainder of the fixture in the CMM coordinate system as determined from the physical fiducials 260. Physical fiducials 260, such as tooling balls and/or CMM surfaces, and use of a CMM cannot be solely used to determine the location of the fixture in the system 10 as the system 16 uses a non-contact optical inspection technique and does not touch or otherwise physically engage the fixture.

The physical fiducials 260 or other fixture CMM surfaces are spaced apart from one another on the fixture. The fixture location and fixture coordinate system may be transformed to a computer-aided design (CAD) or other model coordinate system via use of a coordinate measuring machine (CMM). In various examples, the CAD coordinate system may correspond with or be related to another coordinate system for use with the glass sheet G, such as a vehicle coordinate system, or other final assembly coordinate system. The CMM equipment moves and physically contacts the tooling balls or other alignment surfaces of the fixture to measure or calibrate the fixture. The CMM equipment determines the location of the tooling balls on the fixture to provide three known coordinates for the fixture in a CMM coordinate system, e.g. as three known points in a Cartesian or other CMM coordinate system. For a conventional system and gauging, the surface of the glass sheet G would be contacted by tens or hundreds of probes in order to determine points associated with the sheet, and to measure or gauge the sheet surface.

Figure 6A:
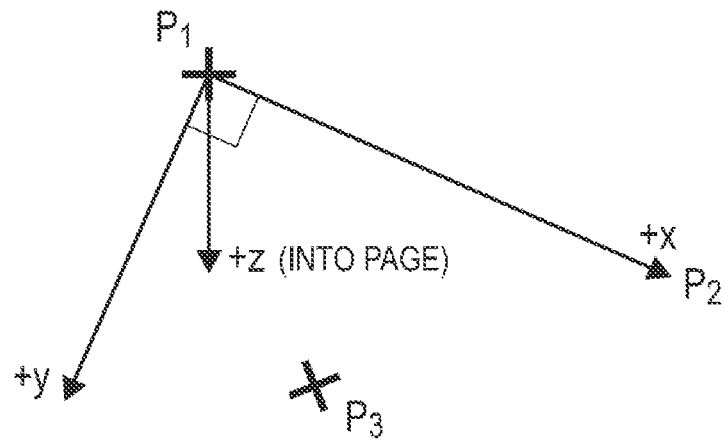
FIGS. 6A, 6B, 6C, and 6D illustrate one or more methods for correlating an optical coordinate system, a CMM coordinate system, and a CAD coordinate system for use with the system of FIG. 1 and the method of FIG. 2.
Figure 6B:
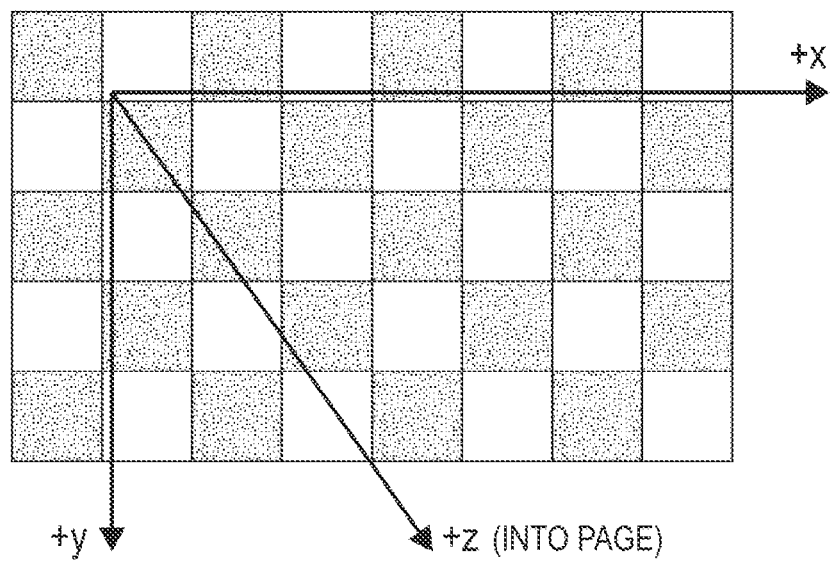
Figure 6C:
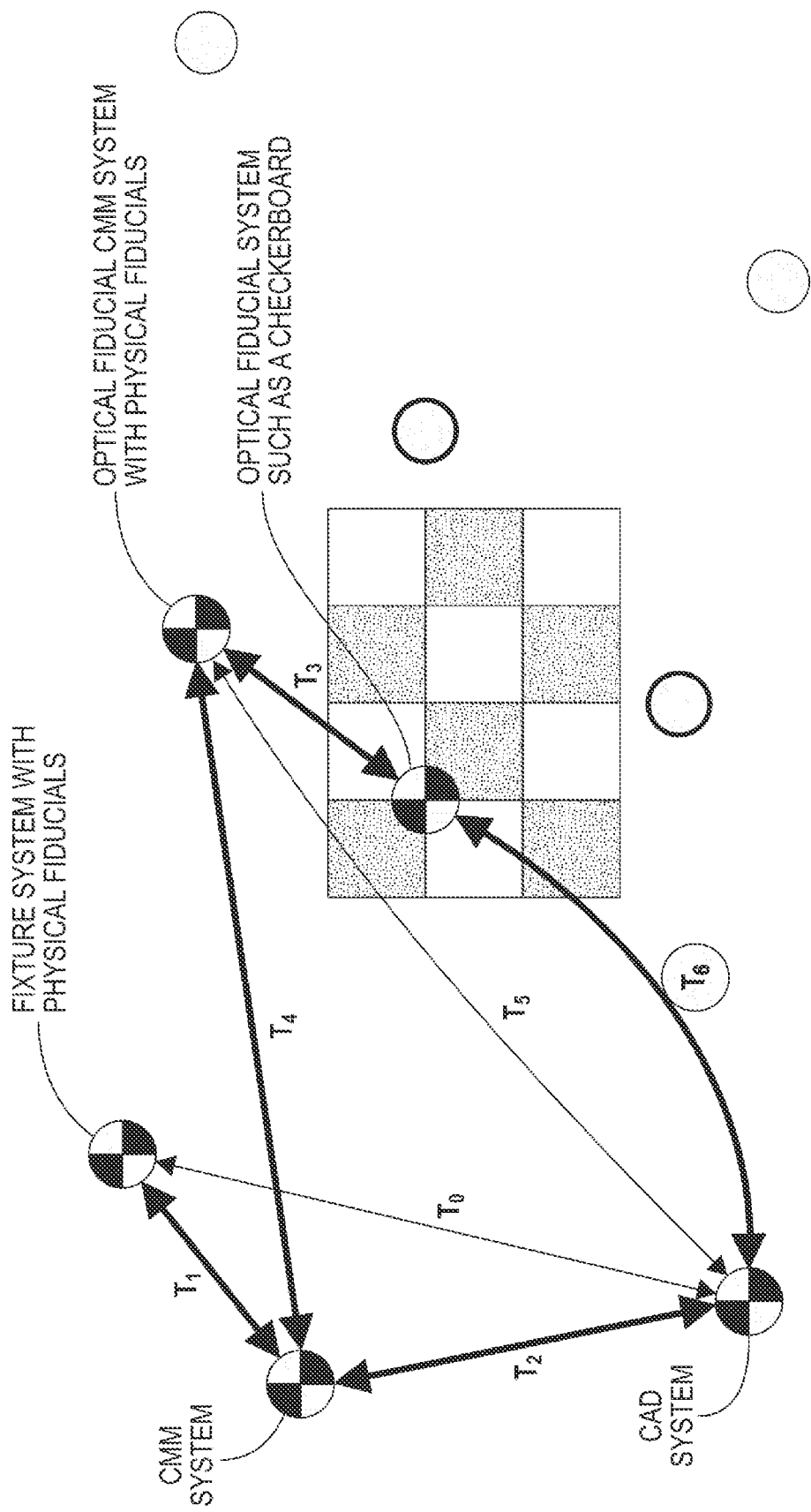
Figures 6D, 8:
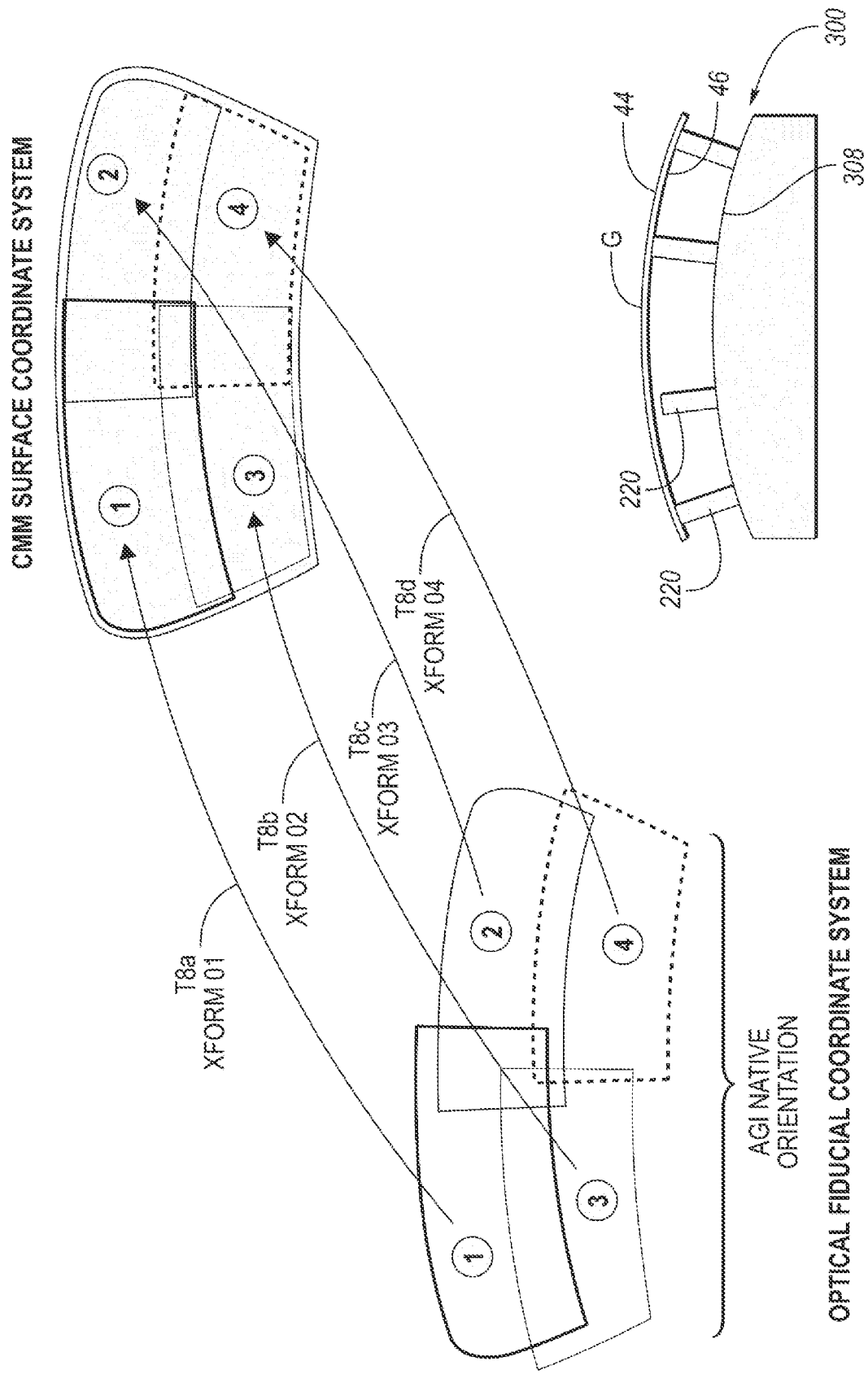
FIG. 8 illustrates a sectional schematic view of the fixture of FIG. 7 with a glass sheet.
Figure 7:
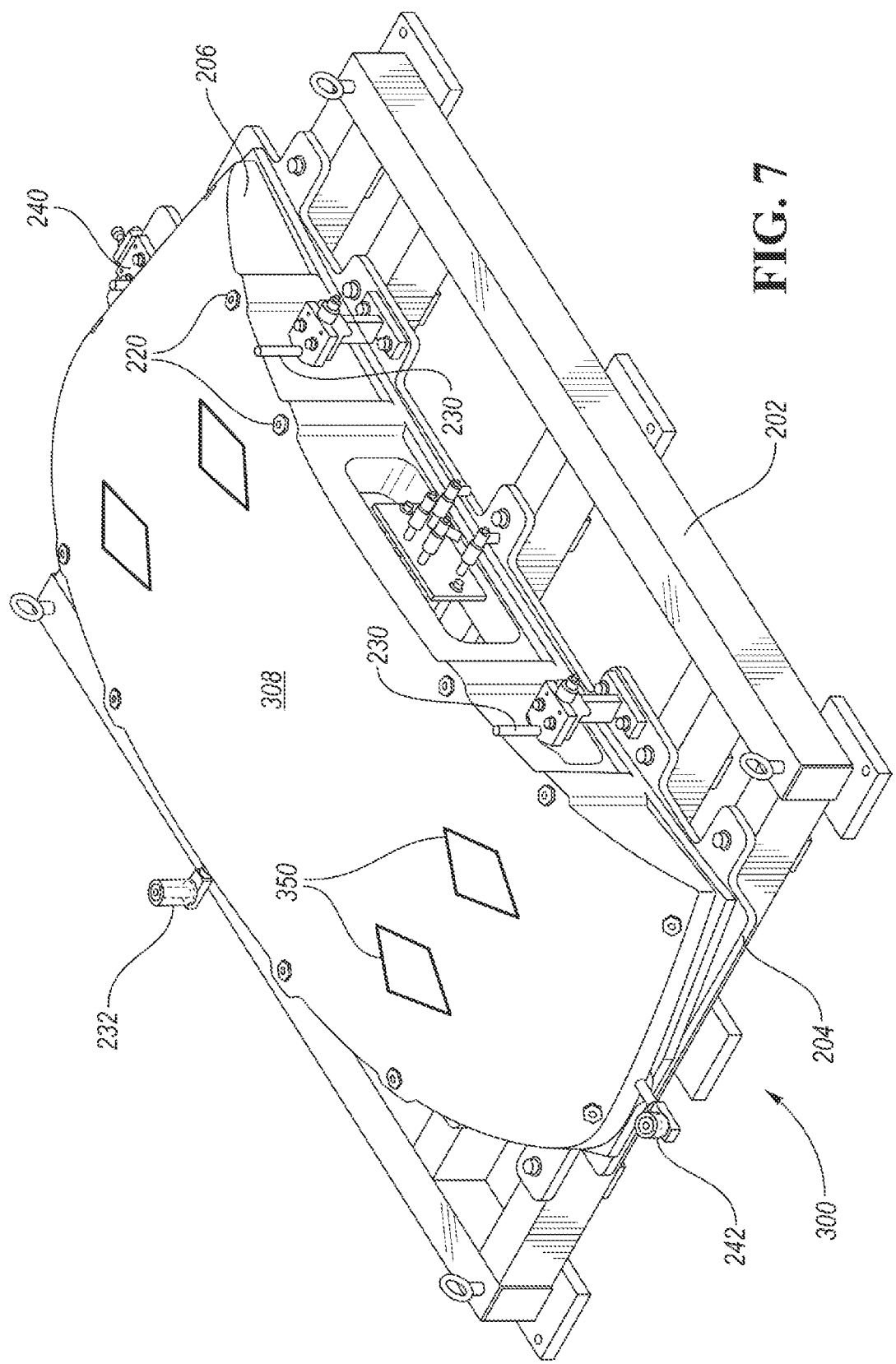
FIG. 7 illustrates a perspective view of a fixture for use with the inspection system of FIG. 1 and method of FIG. 2 according to another embodiment and without a glass sheet.

With reference to FIGS. 7-8, another fixture 300 is illustrated according to another embodiment, and may be used as fixture 14 in the system of FIG. 1, and/or in the method of FIG. 2. For simplicity, components of the fixture 300 that are the same as or similar to those shown and described above with reference to fixture 200 are given the same reference number.

The fixture 300 has an underlying frame 202 that may be supported on the conveyor of the system, and may be used to lift or otherwise move the fixture on a fixture frame 204. In the example shown, the fixture frame has a side wall 206 that extends upwardly from the frame to an upper surface 308. The side wall 206 may be shaped substantially similar to an outer perimeter of the glass sheet G intended for use with the fixture, and may extend continuously as shown.

The upper surface 308 of the fixture frame is contoured or otherwise shaped to correspond with or match the upper surface of a glass sheet G as defined by the model or CAD data for the glass sheet G. The upper surface 308 may be provided as a full surface, such that is extends continuously or as a solid surface, and is surrounded about its perimeter by the side wall 206. In one example, the upper surface 308 is machined to its shape based on the CAD data for the glass sheet G. In a further example, the upper surface 308 may be machined or otherwise formed to its shape to correspond to substantially the center of the CAD data tolerancing for the glass sheet G. In one embodiment, the upper surface 308 may be formed from or include a composite material. The upper surface 308 may act as both a physical fiducial as well as an optical fiducial for the fixture 300, as the surface may be measured by both CMM equipment as well as the system 10.

When the fixture 300 is used with a curved glass sheet G, the first surface 44 of the glass sheet G has a different radius of curvature than the second surface 46 of the glass sheet G. In the non-limiting example shown, the first surface 44 has a larger radius of curvature than the second surface 46 of the glass sheet G. The upper surface 308 of the fixture 300 has the same radius of curvature as the CAD model for the glass sheet G, and may represent the ideal or model first surface 44 of the glass sheet G. FIG. 8 illustrates a schematic sectional view of the fixture 300 with a glass sheet G.

A series of standoff pins 220 are provided on the fixture 300 to support the glass sheet G above the upper surface 308 of the fixture. The standoff pins 220 extend upwardly from the upper surface 308, and are spaced apart from one another about the outer perimeter of the upper surface 308. The standoff pins 220 provide separation between the glass sheet G and the upper surface 308 of the fixture, as well as prevent the second surface 46 of the glass sheet from contacting the fixture. As the second surface 46 of the glass sheet G has a different radius of curvature in comparison to the upper surface 308 of the fixture, the standoff pins 220 may have different heights from one another, with the height of each standoff pin determined using the CAD data for the glass sheet G, along with data related to the shape of the upper and lower surfaces of the glass sheet G, and the shape of the upper surface 308 of the fixture.

Note that the exact shape, size, and surface shape and contour of an actual glass sheet G may differ from the CAD or other mathematical model of a glass sheet G, and therefore, the actual glass sheet G may not be in contact with each and every one of the standoff pins 220 based on variability in the glass sheet G when it is placed on the fixture 300. The standoff pins 220 may act as an A datum to locate the glass sheet G relative to the fixture 300.

The fixture 300 may also be provided with additional datums to locate the edge of the sheet G relative to the fixture. In the example shown, the fixture 300 has one or more B datum posts 230, and an associated B datum mechanism 232, and one or more C datum posts 240, and an associated C datum mechanism 242.

In some embodiments, the upper surface 308 of the fixture 300 may be formed from a material that fluoresces in response to light from the light source in the system 10, or alternatively, the upper surface 308 may have a coating that fluoresces in response to light from the light source in the system 10.

In some embodiments, the upper surface 308 of the fixture 300 may be provided with one or more optical fiducials 350. The optical fiducials 350 may be used to compare the three dimensional point cloud representing the sheet G surface data to the mathematical or CAD model of the sheet G to measure or gauge the sheet, or to compare the alignment data for the fixture 300 to the CMM coordinate system and CAD model to validate the fixture alignment and coordinates and/or to measure or gauge the sheet. The fixture 300 may be provided with one or more optical fiducials 350 for each detector or camera in the system 10. In a further embodiment, the optical fiducials 350 may be located in regions of the upper surface 308 with a larger radius of curvature, e.g. a flatter region.

Each optical fiducial 350 may be provided as a shape or marking on the upper surface 308 of the fixture. In one example, the optical fiducials 350 may be provided as triangles, diamonds, or the like, and may be defined by a groove machined into the surface 308 or a protrusion extending outwardly from the surface 308. The optical fiducials 350 are therefore detectable by CMM equipment such that they may be referenced relative to the other datums of the fixture 300. Additionally, as the optical fiducials 350 may be formed into the surface 308 of the fixture, the location of the optical fiducials 350 relative to the fixture surface 308 is also known. The optical fiducials 350 are also detectable by the system 10 as they cause a change in the fluorescence that is detectable by the camera(s), e.g. the optical fiducial 350 may create a higher or lower intensity of fluoresced light relative to the adjacent surface 308 that is imaged by the camera. In alternative embodiments, a coating or other optical fiducial 350 may be used.

In one example, each camera has its own optical fiducial 350. In another example, the optical fiducial 350 may be sufficiently large to extend across the fields of view of multiple cameras. In one example, at least a portion of the optical fiducial 350 is positioned to be visible to all of the cameras 30 or detectors of the system for a system with one or more cameras. In another example, and for a system 10 with multiple cameras and multiple optical fiducials 350, each optical fiducial may be positioned such that it is within an entirety of a field of view of an associated camera, with the system applying an additional transformation based on the known positioning of the fiducials relative to one another to cross-reference multiple camera data together when creating the calibration and fixture alignment.

In some embodiments, the fixture 300 may additionally be provided with physical fiducials, e.g. tooling balls or other CMM surfaces such as edges or apertures, that are similar to those shown above with reference to FIG. 3.

With reference to FIG. 9, a fixture 400 according to another embodiment and for use with the system of FIG. 1 and method of FIG. 2 is illustrated. For simplicity, components of the fixture 400 that are the same as or similar to those shown and described above with reference to fixture 200 are given the same reference number.

The fixture 400 has an underlying frame 202, and a fixture frame 204. In the example shown, the fixture frame has a side wall 206 that extends upwardly from the frame to an upper surface 208. The side wall may extend continuously about an open central region 210. A series of standoff pins 220 are provided that extend upwardly from the upper surface 208, and are provided to contact and support the glass sheet on the fixture. The series of standoff pins may define an A datum for the fixture.

An exemplar glass sheet G0 is provided with the fixture and is supported on the standoff pins 220. The first surface 44 of the glass sheet G0 may be used as the calibration surface with the system 10 of FIG. 1, and/or with the method of FIG. 2. The glass sheet G0 is removed after the calibration process or method 100, and a glass sheet G may be provided on the fixture 400 for measurement, gauging or the like with the system 10. The first surface of the sheet G0 may act as both a physical fiducial as well as an optical fiducial for the fixture 300, as the surface may be measured by both MINI equipment as well as the system 10. In further examples, the glass sheet G0 may be etched or otherwise provided with optical fiducials such as the optical fiducials 350 described above with respect to FIGS. 7-8, in addition to the optical fiducial provided by the first surface 44 of the glass sheet G0 itself.

In further examples, a fixture with fiducials, such as fiducials 250 and/or fiducials 350, may be provided for use along with a fixture for use with an exemplar glass sheet G0, e.g. by combining features of the fixtures 200, 300 as described with respect to FIGS. 7-8 with the fixture 400 as described with respect to FIG. 9. For clarity, the fiducials 250, 350 may also be referred to as camera optical fiducials to differentiate from the optical fiducial provided by the first surface 44 of the glass sheet G0 itself in this example. For a system 10 with more than one camera 30, an optical fiducial 250, 350 may be provided for each camera such that there is at least one fiducial 250, 350 for each camera 30. When used in conjunction with the glass sheet G0, the optical fiducials may provide additional features for the alignment algorithms to reference and provide an overall solution with greater speed, accuracy, and/or precision.

The fixture 400 may also be provided with additional datums, and in the example shown, the fixture has a pair of B datum posts 230, an associated B datum mechanism 232, a C datum post 240, and an associated C datum mechanism 242.

The fixture may additionally be provided with physical fiducials 260, e.g. tooling balls 260 or other CMM surfaces such as edges or apertures. The glass sheet G0 is positioned using the datums and standoff pins on the fixture 400 relative to known tooling ball locations on the fixture.

Referring back to FIG. 2, steps 106-114 illustrate part of the sub-method 104 for validating the fixture 200, 300, 400, or for correlating, relating, and transforming between fixture coordinates, calibration table coordinates, CMM coordinates, and CAD coordinates. For simplicity, fixture 14 is used generally below with respect to method steps, and may reference the use of any one of fixtures 200, 300, or 400. Furthermore, steps described for use with one of the fixtures 200, 300, 400 and the system 10 may additionally be applied to the other fixtures disclosed herein.

When the fixture 14 is provided at step 106, a mathematical model of the glass sheet G may be provided in a model or CAD coordinate system. For fixture 200, the location of the fixture tooling balls 260 may also be provided in CAD coordinates, e.g. as a fixture tooling ball coordinate system. A relationship between the CAD coordinate system and the fixture tooling ball coordinate system is determined.

For fixtures 300 and 400, the mathematical model of the glass sheet G includes and corresponds to the upper surface 308 of the fixture or the upper surface of the glass sheet G0, receptively. In a further example, the mathematical model or file may be generated that contains the mathematical model of the upper surface 308 or upper surface of the sheet G0 in CAD coordinates, and also include any tooling ball locations and glass datums on the fixture.

At step 108, the fixture 14 may be calibrated using CMM equipment. For fixture 200, the CMM equipment has a CMM coordinate system. The CMM equipment measures the fixture's physical fiducials 260 and/or any other CMM surfaces on the fixture. The CMM equipment also measures any physical fiducials 270 on the optical fiducial. The CMM equipment provides an optical fiducial CMM surface coordinate system. The CMM equipment may additionally provide a fixture CMM coordinate system. Both the optical fiducial CMM surface coordinate system and fixture CMM coordinate system are referenced to the CMM coordinate system as described below with reference to examples in FIGS. 6A-D. The fixture 200 may be measured using the CMM equipment to determine the location of the first and second series of physical fiducials of the fixture and the optical fiducial in CMM coordinates.

For fixture 300, the upper surface 308 may be measured using CMM equipment to verify that the shape of the upper surface 308 corresponds to the first surface 44 of the glass sheet G in the CAD data. The CAD data may be located relative to datums and fiducials on the fixture 300 that are known in the measured CMM data. Data, e.g. in a file, may be generated that includes both the CAD data, calibration surface 308, optical fiducial 350, and any other datum locations with reference to the CMM coordinate system. This may enable a unified coordinate system between the CAD and CMM coordinate systems. In other examples, the upper surface 308 of the fixture 300 may not be measured using CMM equipment, and step 108 may be omitted.

For fixture 400, the glass sheet G0 is measured using CMM equipment to determine the shape of the sheet G0, and reference the sheet G0 to any tooling balls of the fixture 400. Data, e.g. in a file, may be generated that includes the first surface 44 of the sheet G0, any optical fiducials on the sheet G0, and any other datum locations with reference to the CMM coordinate system.

At step 110, the fixture 14 is positioned within the system 10. The fixture is located at a known position on a stationary conveyor 12 and the fixture is imaged using the cameras 30 or other detectors in the system 10. The fixture 14 may be imaged without the operation of the system light source 40, for example, when the light source is a laser and with fixture 200. Alternatively, the fixture 14 may be imaged while the light source 40 is operating, for example, when using fixture 300 or 400.

Fixture 200 may be positioned in the system 10 without a glass sheet G, and at the height that the fixture 200 would be positioned in the system with a sheet G.

Fixture 300 may be positioned in the system 10 without a glass sheet G, and may be raised in the system 10 such that the upper surface 308 is located at a height that corresponds to that of the upper surface of a glass sheet G when present on the fixture 300 in the system 10. This places the fixture surface 308 at the same elevation or z-location as the upper surface of the glass sheet G when it is measured on the system 10. Note that the height or location of the upper surface 308 is therefore different between the calibration method and when a sheet G is being inspected, measured, or gauged.

Fixture 400 may be positioned in the system with the exemplar sheet G0, and at the height that the fixture 200 would be positioned in the system with a sheet G to be measured or tested. Note that the sheet G0 is removed and replaced with a sheet G for an inspection, measurement, or gauging process. The sheet G0 may be stored for later use, such as recalibration of the fixture 400.

For a fixture combining optical fiducials 250, 350 and use of an exemplar glass sheet G0, as described above, the fixture may be positioned in the system without the glass sheet G0 to be measured and tested a first time, and then positioned in the system with the glass sheet G0 to be measured or tested a second time, or vice versa.

Figure 5A:
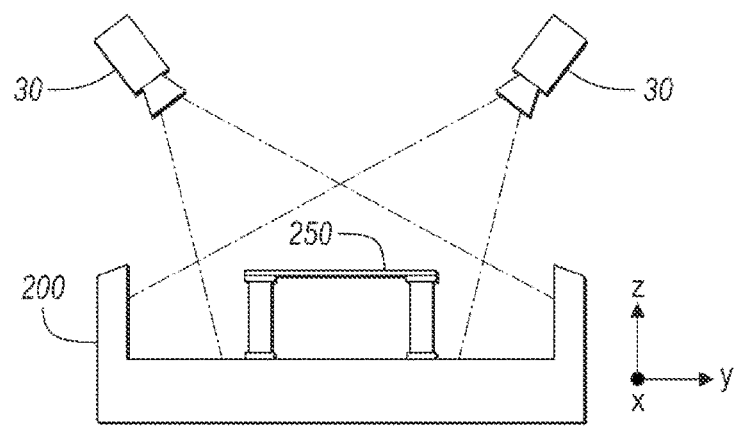
FIGS. 5A, 5B, and 5C illustrate schematic views of a fixture in the system of FIG. 1 for calibration of the optical coordinates for various configurations of the system of FIG. 1.

FIG. 5A illustrates a schematic view of a fixture 14 with one camera 30 or with two cameras 30 positioned on either side of the fixture, e.g. upstream and downstream of the fixture. The fixture may be positioned in the system such that the optical fiducial is entirely within the field of view of all camera(s) as described above. Fixture 200 is used by way of a non-limiting example in FIG. 5A.

Figure 5B:
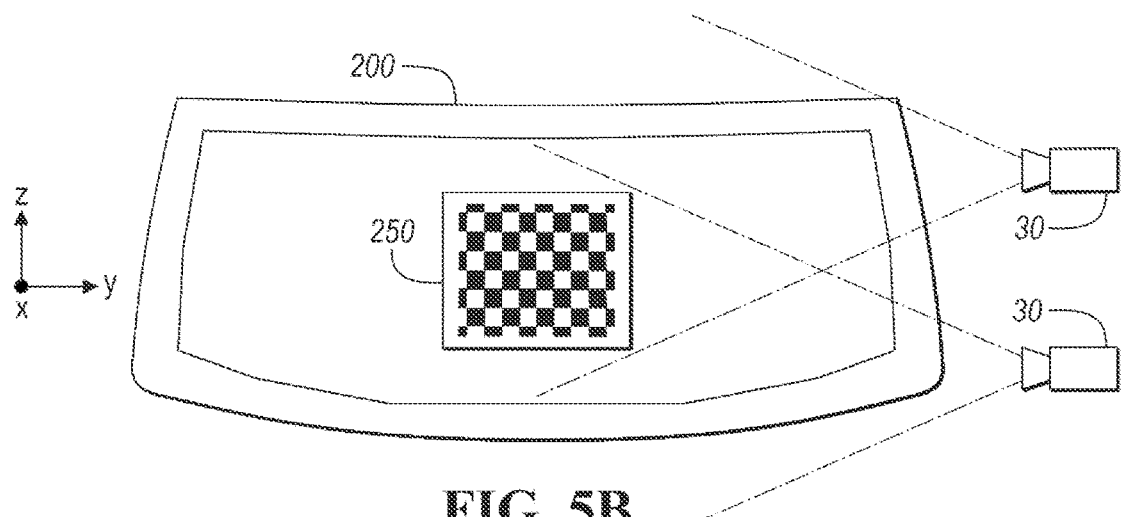

FIG. 5B illustrates a schematic view of a fixture 14 with two cameras positioned on the same side of the fixture, e.g. both upstream or both downstream. The fixture may be positioned in the system such that the optical fiducial is entirely within the field of view of both cameras as described above. Fixture 200 is used by way of a non-limiting example in FIG. 5B.

Figure 5C:
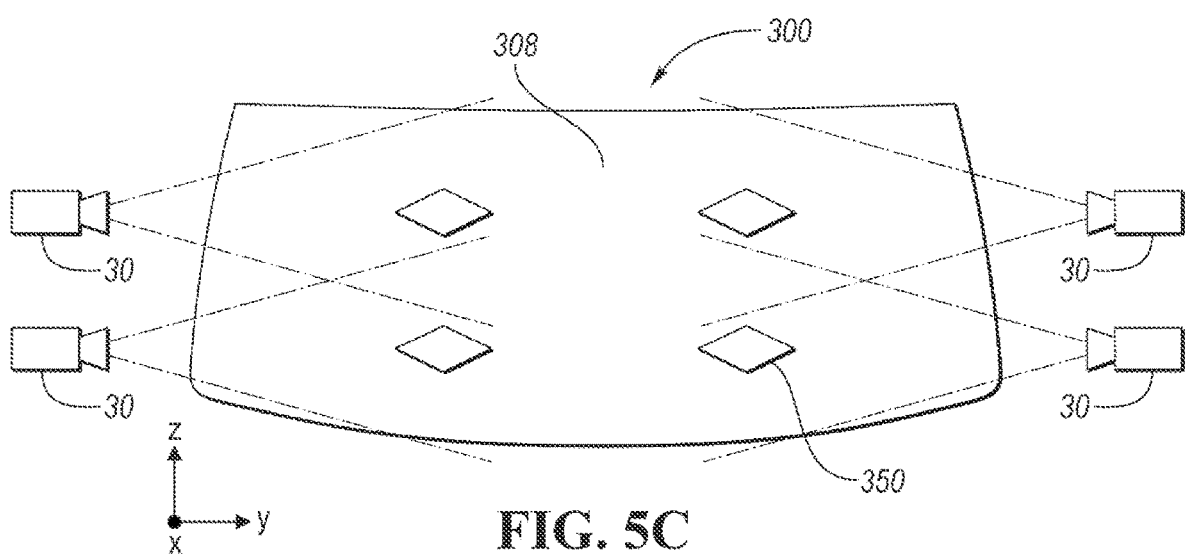

FIG. 5C illustrates a schematic view of a fixture 14 with multiple optical fiducials 350 and multiple cameras 30, with each camera having at least one of the optical fiducials entirely within its field of view, and the positioning of the optical fiducials otherwise known relative to one another. Fixture 300 is used by way of a non-limiting example in FIG. 5C.

Referring back to FIG. 2, at step 112, the fixture and any optical fiducials are imaged using detector(s) 30 in the system 10. The system 10 may then create an optical fiducial coordinate system, and may additionally create an optical fiducial CMM surface coordinate system.

For fixture 200, the optical fiducial(s) 250 are imaged using the cameras 30 to provide an optical calibration of the fixture without a glass sheet G and locate the optical fiducial in the system 10 coordinate system as measured and referenced to the optical data and cameras, e.g. as an optical fiducial coordinate system. The optical fiducial may be located or optically calibrated once, or may be located and optically calibrated each time it is positioned on the conveyor.

The image data may be processed to reduce noise, for example, by applying thresholds to the image, normalizing the image, transforming the image using a fast Fourier transform, filtering the image, and the like.

The computer system creates an optical fiducial coordinate system based on the optical data calibration table. The size of the checkerboard squares or other features on the optical fiducial 250 are known to provide a calibration in the x and y direction. The calibration in the z-direction is based on the relation between the x and y calibrations and accurately locate the optical fiducial and fixture in the image and create an optical coordinate system. Details of the creation of an optical coordinate system from the image are described below with reference to an example as shown in FIGS. 6A-C.

According to one example, the checkerboard or other optical fiducial 250 may be applied to a substrate on the fixture, e.g. as a decal or the like. In other examples, the checkerboard may be printed directly onto the substrate or the substrate may be formed or otherwise provided with the optical fiducial 250. Depending on how the optical fiducial is applied to the substrate, there may be variances in the position of the optical fiducial or checkerboard on the substrate itself, such that the location of the optical fiducial 250 relative to the fixture needs to be determined. As such, the optical fiducial 250 is also provided with associated physical fiducials 270. The physical fiducials 270 may be formed prior to or subsequent to application of the optical fiducial 250 to the fixture. At step 112, the image of the optical fiducial 250 also includes imaging the physical fiducials 270. The image analysis may locate the physical fiducials 270 in an optical fiducial CMM surface coordinate system, as well as locate the optical fiducial 250 in an optical fiducial coordinate system, with both coordinate systems referenced to the image space. The image analysis may locate the physical fiducials 270 or markers based on visual features of the physical fiducials 270.

For fixture 300 and step 112, the fixture 300 may be imaged while operating the system light source 40 or laser. The upper surface 308 of the fixture may be formed from a material that fluoresces in response to light from the laser, or alternatively, the upper surface 308 may be painted or coated such that it fluoresces in response to the light source. Each camera 30 may image its respective associated fiducial 350. Each camera 30 provides associated image data and point cloud for the associated viewing region on the upper surface 308. The system 10 provides an optical calibration of the fixture 300 without a glass sheet G and locates the upper surface 308 and optical fiducial(s) 350 in the system 10 coordinate system as measured and referenced to the optical data and cameras, e.g. as an optical fiducial coordinate system.

Fixture 400 may also be imaged at step 112 while operating the system light source 40 or laser. The upper surface of the sheet G0 fluoresces in response to light from the laser, and each camera 30 provides associated image data and point cloud for the associated viewing region in the system 10. The system 10 provides an optical calibration of the fixture 400 using the exemplar sheet G0 in the system 10 coordinate system as measured and referenced to the optical data and cameras, e.g. as an optical fiducial coordinate system.

For a fixture using a combination of optical fiducials 250, 350, and an exemplar glass sheet G0 to provide a calibration, the optical fiducial(s) 250, 350 may be imaged as described above to provide an optical calibration of the fixture without the presence of a glass sheet and locate the optical fiducials in the system 10 optical fiducial coordinate system in a first dataset, which may include image data from a single camera or data pieced together from multiple cameras using transformations as appropriate. The exemplar glass sheet G0 is positioned on the fixture, and the fixture is imaged as described above with respect to the exemplar glass sheet G0 to provide an optical calibration of the sheet G0 in the system 10 optical fiducial coordinate system in a second dataset. The image data from the optical fiducials, such as fiducials 250, 350 may be used to generate transformations to align and combine data from multiple cameras together in the system 10 optical fiducial coordinate system. The image data from the surface of the exemplar glass sheet G0 may be used in generating the transformation(s) to correlate the system 10 optical fiducial coordinate system to the CAD coordinate system as described below, e.g. by correlating the optical coordinate system to the CMM data and coordinate system. At step 114, the optical fiducial coordinate system may be correlated to the CMM coordinates and/or the optical fiducial CMM coordinate system.

Linear algebraic transformations may be applied that results in transformation matrices that relate the CMM-determined optical fiducial coordinates to the optically determined optical fiducial coordinates and to the CAD coordinate system, as described below with reference to the examples of FIGS. 6A-D.

At step 130, the system 10 is then ready to begin to inspect glass sheets G on the fixture, and measure or gauge the surface by comparing the point cloud matrix defining the surface to CAD data representative of what the sheet G surface should be. The glass sheet G is scanned using the sub-system 16 to create a point cloud or matrix for the surface of the glass sheet. The system uses the calibration and transformation matrix between the optically determined optical fiducial coordinate system and the CAD coordinate system to locate the sheet surface point cloud relative to the CAD data within the CAD coordinate system. The CMM data and coordinates, as well as any data of interest from probes, standoffs, the sheet G surface cloud, and the like, as well as known locations of a fixture in the CAD coordinate system, allows for a correlation or transformation from optically determined coordinates to CAD coordinates. These transformations align the different data from different coordinate and measurement systems for comparison purposes.

Once a fixture has been validated using CMM equipment, the calibration process for the fixture may proceed and omit step 108, as the transformation or correlation between the optical coordinates and CMM coordinates is already known.

In a further example, the calibration process and method 100 may proceed and omit step 108 and any use of CMM data and coordinates, with a transformation or correlation directly between the optical coordinates and CMM coordinates based on the optical fiducial being built into a known, precise and accurate location in the fixture.

FIGS. 6A-6D illustrate various methods for correlating the optical coordinates, the CMM coordinates, and the CAD coordinates. The method may be implemented in whole or in part by the control system 18, 20 of the system 10. Alternatively, part of the method may be implemented by another system, such as a CMM, and the CMM coordinate system and transformation to CAD coordinates input into memory connected to the control system 18, 20 of the system 10. The methods illustrated in FIGS. 6A-D may be embodied in other forms with other transformations between the various coordinate systems based on the data and systems available, and the examples shown in FIG. 6A-D are intended to illustrate methods of correlating coordinate systems for use with the system 10. In one non-limiting example, the method illustrated in FIGS. 6A-C may be used with fixtures 200, 300, or 400. In another non-limiting example, the method illustrated in FIG. 6A, B, and D may be used with fixtures 300, 400.

FIG. 6A illustrates deriving a coordinate system from three, non-colinear points, $P_1$, $P_2$, and $P_3$ according to one non-limiting example. The three non-colinear points may represent three different points as measured from physical fiducials 260 such as tooling balls or other CMM surfaces on the fixture 14, using the CMM, and in the CMM coordinate system. To convert three, non-colinear points to a three-dimensional coordinate system, such as a Cartesian coordinate system, $P_1$ is selected by the controller as the origin. Then, the positive X-axis is defined by the controller as the [unit] vector from $P_1$ to $P_2$. The Y-axis is defined by the controller as the [unit] vector both perpendicular to the already-defined X-axis and in the plane defined by $P_1$, $P_2$, and $P_3$. Finally, the Z-axis is calculated by the controller as the cross-product of the previously defined X and Y axes. In other examples, other conventions may be used by the controller to define a coordinate system from three points, as long as the convention is consistent, and further, other coordinate systems may be used.

FIG. 6B illustrates deriving a coordinate system from an optical fiducial such as a checkerboard, other calibration table, or fixture surface according to one non-limiting example. The coordinate system may be derived by the control system of the system 10 as an optical coordinate system based on data from the detector(s) or camera(s) of the system 10. In one non-limiting example, the origin is defined by the controller is as one of the interior corners of the checkerboard, as shown in FIG. 6B. For a Cartesian coordinate system, the X-axis may be aligned by the controller along one edge of the checkerboard and the Y-axis along the other edge, such that the checkboard or optical fiducial lies within an X-Y plane. The Z-axis is then calculated by the controller as cross-product of the X and Y axes. In other examples, other conventions may be used by the controller to define a coordinate system from three points, as long as the convention is consistent, and further, other coordinate systems may be used.

FIG. 6C illustrates a schematic of a chain of transformations that may be used to convert between the various coordinate systems for use with the system 10 and method 100 according to the present disclosure. According to one example, transformation between two given coordinate systems may be provided by a transformation matrix, equations, or the like as calculated via linear algebra. The transformation between two coordinate systems may account for translation from the first coordinate system to the second coordinate system, rotation of the first coordinate system to the second coordinate system, and/or scaling of the first coordinate system relative to the second coordinate system, via a transformation matrix between the two respective coordinate systems.

According to the present example, the system 10, fixture 14, 200, 300, 400, and method 100 uses five coordinate systems, although another number of coordinate systems may be possible based on data available to the system 10. These five coordinate systems are represented in FIG. 6C with the transformations and transformation matrices between them schematically illustrated. The five coordinate systems are as follows according to the present example:

The CAD or model coordinate system is provided, and may represent the glass sheet G in a product, end use, or other configuration.

The CMM coordinate system is provided and represents the default coordinate system used and measured by the CMM equipment.

The physical fiducial coordinate system is provided and represents the coordinate system of the physical fiducials 260 by three points given in CAD coordinates, e.g. the tooling balls of the fixture 200 as modeled or positioned within the CAD model or space.

The optical fiducial coordinate system, e.g. checkerboard coordinate system, is provided and represents the coordinate system of the optical fiducial 250 on the fixture as measured using the detector(s) or camera(s) of the system 10, or of the calibration surface and optical fiducials 350 on the fixture, or the surface of the exemplar glass sheet G0.

The optical fiducial CMM surface coordinate system is provided and represents the coordinate system defined by three points represented by physical fiducials 270 on the optical fiducial such as edges, apertures, or other fiducial markers in the plane of the checkerboard and as measured using the detector(s) or camera(s) of the system 10, or may represent the calibration surface and optical fiducials 350 on the fixture, or the surface of the exemplar glass sheet G0.

Transformations and transformation matrices may be provided between the above referenced coordinate systems as follows, and by way of one non-limiting example:

A transformation $T_0$ may be provided from the CAD system to the fixture physical fiducial system. As the tooling balls or other physical fiducials 260 are already defined in CAD coordinates in the present example, this can be determined directly and without a mathematical transformation.

A transformation $T_1$ may be provided to transform the physical fiducial coordinate system to the CMM coordinate system by measuring the tooling balls or other fixture physical fiducials 260 in CMM coordinates via CMM equipment.

A transformation $T_2$ may be provided and derived using $T_0$ and $T_1$ to provide a conversion or transformation from the CAD coordinate system to the CMM coordinate system.

A transformation $T_3$ may be provided to transform the optical fiducial coordinate system to the optical fiducial CMM surface coordinate system, e.g. to relate the coordinate system for the checkerboard to the coordinate system of the physical fiducials 270 on the checkerboard. In one example, the transformation $T_3$ may be determined via measurements or data from the detector(s) or camera(s) of the system 10 as it only involves a transformation in two dimensions, i.e. the X-Y plane of the optical fiducial or checkerboard. In order for the transformation to be determined, absolute alignment of the optical fiducial of the fixture to the X and Y axis may be required.

A transformation $T_4$ may be provided as the transformation from the optical fiducial CMM surface coordinate system to the CMM system by measuring the physical fiducials 270 or CMM surfaces on the optical fiducial in CMM coordinates via CMM equipment.

A transformation $T_5$ may be provided and derived using $T_2$ and $T_4$ to provide a conversion or transformation from the optical fiducial CMM surface coordinate system to the CAD coordinate system.

Finally, a transformation $T_6$ may be provided and derived from $T_3$ and $T_5$ to provide a conversion or transformation from the optical fiducial coordinate system to the CAD coordinate system.

With the calibration table coordinate system related to the CAD coordinate system, the later point cloud or three-dimensional map of the surface of the sheet G from the cameras may be accurately and precisely located in the CAD model for measurement and gauging.

The computer 20 receives image data from the camera 30. The computer 20 forms a matrix or point cloud using data from the image, e.g. cells in the matrix associated with positions on the surface 44 of the glass sheet, or as an array of points in the point cloud associated with positions on the surface 44 of the glass sheet. The control system may perform various denoising steps as post-processing on the point cloud. The three-dimensional map of the surface of the glass sheet G as determined from the point cloud is located or referenced relative to the coordinate system of the calibration table, or calibration surface and optical fiducial, by the system 10. This then allows use of a transformation matrix such as $T_6$ to transform the three-dimensional map of the surface of glass sheet G into the CAD model in order to compare the measured surface map to the CAD model, e.g. for measurement, gauging, or other inspection functions.

The CAD model may contain a mathematical model or gauge model of the glass sheet G in the CAD coordinate system. The gauge model may be provided using computer aided design (CAD) models and/or data, or other mathematical models or representations of dimensions or shapes. The control system may select the appropriate CAD model, gauge model, and transformations based on the identification of the fixture using the visual indicator on the calibration table or fixture.

FIG. 6D illustrates another schematic of a chain of transformations that may be used to convert between the various coordinate systems for use with the system 10 and method 100 according to the present disclosure, and which may be used in place of the transformations as shown in FIG. 6C. FIG. 6D illustrates a system 10 with four detectors or cameras, although it is anticipated that FIG. 6D may be modified for use with a system 10 having any number of detectors, including one detector, less than four detectors, or more than four detectors.

According to one example, transformation between two given coordinate systems may be provided by a transformation matrix, equations, or the like as calculated via linear algebra. The transformation between two coordinate systems may account for translation from the first coordinate system to the second coordinate system, rotation of the first coordinate system to the second coordinate system, and/or scaling of the first coordinate system relative to the second coordinate system, via a transformation matrix between the two respective coordinate systems.

According to the present example, the system 10, fixture 14, 300, 400, and method 100 uses two or three coordinate systems, although another number of coordinate systems may be possible based on data available to the system 10. The CMM and optical fiducial coordinate systems are represented in FIG. 6D with the transformations and transformation matrices between them schematically illustrated by way of a non-limiting example.

A transformation $T_7$ may be provided or derived to provide a conversion or transformation from the CAD coordinate system to the CMM surface coordinate system. In other examples, transformation $T_7$ may be omitted. The calibration surface and optical fiducials of the fixtures 300, 400 may be measured with the CMM equipment such that they are directly referenced to the CMM surface coordinate system.

One or more transformations $T_8$ may be provided to relate the optical fiducial coordinate system to a model coordinate system. A model of the glass sheet may be provided in a model coordinate system based on the CAD data or based on CMM data of the calibration surface 308 or sheet surface G0, and any other fiducials measurable by the CMM system. In a further example, transformations $T_7$ and $T_8$ are used to relate the optical fiducial coordinate system to the model coordinate system.

The one or more transformations $T_8$ may transform the optical fiducial coordinate system to the CMM surface coordinate system, e.g. to relate the coordinate system for the calibration surface and optical fiducials to the coordinate system of the physical fiducials 270 on the checkerboard. In one example, the transformation $T_8$ may be determined via measurements or data from the detector(s) or camera(s) of the system 10, as well as the known location of the detector 30 and light source 40.

For example, the computer 20 may determine or calculate points along a model line based on the image data of the visible fluoresced line on the calibration surface of the fixture. As such, the computer 20 calculates the points for a model line as a series of coordinates or (x, y) datasets. These (x, y) datasets are then input by the computer 20 into associated cells in a matrix or point cloud. Each dataset may include an (x, y) value corresponding to the location of the calibration surface in an x-y plane.

A third coordinate, such as a (z) coordinate, for the calibration surface may be triangulated using a position of the laser, a position of the camera, and the first and second coordinates, and is stored in the matrix or point cloud. The computer 20 may calculate a z-value for each set of (x, y) coordinates associated with the z-location of that set of coordinates on the calibration surface. The computer inputs the (z) values into the associated cells in the matrix with the corresponding (x, y) coordinates to complete the map of the calibration surface viewable for that camera 30. A method of determining (x, y, z) datasets or point clouds from a surface using the system 10 is further described in PCT Patent Application Serial No. PCT/US19/43180, and may be used here according to one example to determine the (x, y, z) coordinates or datasets for the calibration surface of the fixture.

Once the calibration surface point cloud has been determined by the system 10 in the optical coordinate system, the computer 20 then relates the optically measured calibration surface data or calibration surface point cloud data to the CMM data or CAD data for the calibration surface of the fixture. According to one example, the optically measured calibration surface data is aligned to the CMM data using surface fitting algorithms, and a transformation $T_8$ is created. The optical fiducials provided on the calibration surface of the fixture may further aid in locating and fitting the optically measured calibration surface data to the CMM data, especially in flatter regions. The transformation $T_8$ may translate and/or rotate the point cloud from each camera 30 to the associated CMM or CAD data for the same region of a sheet.

In a further example, the optically measured calibration surface data may be directly aligned to the CAD data using surface fitting algorithms if the CMM data is identical to the CAD data, otherwise a transformation $T_7$ may be applied.

In the example shown, a separate transformation $T_8$ is determined for each detector or camera 30, and these transformations are illustrated as T8a, T8b, T8c, and T8d. The transformations T8a-d may be maintained as separate transformations associated with different regions of the calibration surface and sheet. As such, they may be easily regenerated as they do not need to be related to one another or combined with one another. According to one example, separate transformation matrices T8a-d are used with the system 10 when an invariant metric, such as optical reflectance, is being determined by the system 10 for a sheet G on the fixture 300, 400. According to another example, the transformation matrices T8a-d may be combined into a single transformation matrix T8* for use with the system 10 when the system 10 is being used for non-contact gauging of a sheet G on the fixture 300, 400. Adjacent fields of view of the cameras may have overlap with one another.

The transformations $T_8$ may be easily regenerated using the system 10 and fixture 300, 400 for various positions of the fixture or sheet in the system 10, e.g. at varying tilt angles. Furthermore, the use of fixtures 300, 400 allows for the transformations $T_8$ to be easily regenerated if components of the system 10 are reconfigured, or to account for drift or error in the system 10 over time.

With the optical fiducial coordinate system related to the CMM and/or CAD coordinate system, the later point cloud or three-dimensional map of the surface of the sheet G from the cameras may be accurately and precisely located in the CAD model or other model for measurement and gauging using the transformation matrices $T_8$.

When a sheet G is positioned on the fixture 300, 400 in the system 10, the computer 20 receives image data from each camera 30. The computer 20 forms a matrix or point cloud using data from the image, e.g. cells in the matrix associated with positions on the surface 44 of the glass sheet, or as an array of points in the point cloud associated with positions on the surface 44 of the glass sheet. The control system may perform various denoising steps as post-processing on the point cloud. The three-dimensional map of the surface of the glass sheet G as determined from the point cloud is located or referenced relative to the coordinate system of the calibration surface and optical fiducial(s) by the system 10. This then allows use of a transformation matrices, $T_8$, to transform the three-dimensional map of the surface of glass sheet G into the CAD or other model, or to compare to the CMM data, in order to compare the measured surface map to the CAD model, e.g. for measurement, gauging, or other inspection functions.

The CAD model may contain a mathematical model or gauge model of the glass sheet G in the CAD coordinate system. The calibration surface of the fixture 300, or upper surface of the exemplar sheet G0 may be based on or referenced to this CAD model such that they directly correspond to one another or have a known relationship based on $T_7$. The gauge model may be provided using computer aided design (CAD) models and/or data, or other mathematical models or representations of dimensions or shapes. The control system may select the appropriate CMM or CAD model, gauge model, and transformations based on the identification of the fixture using one or more visual indicators on the fixture 300, 400.

The method 100 provides for locating and calibration of the glass sheet G using non-contact gauging of the surface and of the glass sheet G, and use of the resulting map of the sheet as determined by the system in comparison to CAD or other gauging models in other coordinate systems. The fixture and associated calibration and inspections methods allow for accurate and precise on-line monitoring and inspection of parts, and allows for rapid and easy gauging of a series of different parts, or use of multiple gauge models. Furthermore, non-contact gauging via method 100 provides for reduced time and expenses associated with gauging a part, as the gauge model may be easily created, changed, or updated using CAD data and updates to the calibration transformations, and does not require the use of precision measurement gauging tools for contact gauging that are part specific.

In further embodiments, the fixture and method may be used with the optical system to calibrate a system for optically inspecting an object other than a glass sheet G. In one, non-limiting example, an optical system with a laser emitting light in another wavelength, such as a visible wavelength, may be used to scan an object having a diffuse surface. The optical system uses one or more camera(s) with the methods as described above to determine a three-dimensional surface map of the diffuse surface.

Aspects of the Disclosure.

Aspect 1. An optical inspection system has a fixture to support the glass sheet, with the fixture having an optical fiducial provided thereon. An ultraviolet laser and associated optics form a planar laser sheet directed to the glass sheet, where the planar laser sheet intersects a surface of the glass sheet thereby causing the surface of the glass sheet to fluoresce and form a visible wavelength line on the surface. A camera has an image sensor for detecting the optical fiducial and for detecting the visible wavelength line across at least a portion of a width of the sheet. A control system is configured to (i) image the optical fiducial on the fixture, (ii) define an optical fiducial coordinate system from the imaged optical fiducial, (ii) receive a mathematical model of the glass sheet in a model coordinate system, and (iii) relate the optical fiducial coordinate system to the model coordinate system via at least one transformation.

Aspect 2. The system of preceding aspect 1 or any of the subsequent aspects where the control system is further configured to (i) receive image data indicative of the visible wavelength line from the camera, (ii) analyze the data from the camera to determine first and second coordinates in a series of coordinates associated with the line, (iii) triangulate a third coordinate associated with each of the first and second coordinates in the series of coordinates, and (iv) create a three-dimensional map of the surface of the glass sheet as a function of the series of coordinates.

Aspect 3. The system of any of the preceding or subsequent aspects where the control system is further configured to transform the three-dimensional map via the at least one transformation to relate the three-dimensional map to the model coordinate system.

Aspect 4. The system of any of the preceding or subsequent aspects where the control system is further configured to output a metric indicative of a measurement of the glass sheet in response to comparing the three-dimensional map to the mathematical model in the model coordinate system.

Aspect 5. The system of any of the preceding or subsequent aspects where the control system is further configured to determine the metric as a simulated optical reflectance of the surface using the three-dimensional map of the surface in comparison to the mathematical model in the model coordinate system.

Aspect 6. The system of any of the preceding or subsequent aspects where the control system is further configured to determine the metric to gauge the glass sheet using the three-dimensional map of the surface.

Aspect 7. The system of any of the preceding or subsequent aspects where the control system is further configured to receive a series of data indicative of a series of visible wavelength lines from the camera as measured across the width of the sheet, with each line corresponding to a different location along the surface of the glass sheet. The control system is further configured to analyze each of the series of visible wavelength lines to determine first and second coordinates in a series of coordinates associated with each line, triangulate a third coordinate associated with each of the first and second coordinates in each of the series of coordinates, and create the three-dimensional map of the surface of the glass sheet from each the series of coordinates.

Aspect 8. The system of any of the preceding or subsequent aspects where a wavelength of the ultraviolet laser is selected to be non-transmissive through the glass sheet.

Aspect 9. The system of any of the preceding or subsequent aspects where the fixture has a first series of physical fiducials, the first series of physical fiducials having at least three coordinates in the model coordinate system.

Aspect 10. The system of any of the preceding or subsequent aspects where the first series of physical fiducials of the fixture is provided by a calibration surface shaped to correspond with at least a portion of the surface of the glass sheet.

Aspect 11. The system of any of the preceding or subsequent aspects where the calibration surface additionally forms an optical fiducial.

Aspect 12. The system of any of the preceding or subsequent aspects where the fixture has at least one optical fiducial, the at least one optical fiducial positioned on the calibration surface.

Aspect 13. The system of any of the preceding or subsequent aspects where the at least one optical fiducial additionally provides at least one physical fiducial.

Aspect 14. The system of any of the preceding or subsequent aspects where the control system is further configured to determine or derive a transformation from the optical fiducial coordinate system to the model coordinate system.

Aspect 15. The system of any of the preceding or subsequent aspects where the fixture has a calibration surface shaped to correspond with at least a portion of the surface of the glass sheet provided by an exemplar glass sheet G0 to provide a first optical fiducial.

Aspect 16. The system of any of the preceding or subsequent aspects where the fixture has a camera optical fiducial associated with each camera.

Aspect 17. The system of any of the preceding or subsequent aspects where the control system is further configured to image the camera optical fiducials to relate the cameras via at least one another transformation, and separately image the calibration surface as the optical fiducial to relate the optical fiducial coordinate system to the model coordinate system via the at least one transformation.

Aspect 18. The system of any of the preceding or subsequent aspects where the control system is configured to determine or receive a transformation relating a fixture physical fiducial coordinate system to the model coordinate system as determined using the first series of physical fiducials from the fixture.

Aspect 19. The system of any of the preceding or subsequent aspects where the optical fiducial also defines a second series of physical fiducials. The control system is configured to image the second series of physical fiducials and relate the second series of physical fiducials to the optical fiducial coordinate system.

Aspect 20. The system of any of the preceding or subsequent aspects where the control system is configured to determine or receive a transformation relating the fixture physical fiducial coordinate system to a physical fiducial coordinate system of the optical fiducial as determined using the first series of physical fiducials from the fixture and the second series of physical fiducials from the optical fiducial.

Aspect 21. The system of any of the preceding or subsequent aspects where the control system is further configured to determine or receive a transformation relating the fixture physical fiducial coordinate system to the second series of physical fiducials.

Aspect 22. The system of any of the preceding or subsequent aspects where the control system is further configured to determine or derive a transformation from the model coordinate system to the second series of physical fiducials.

Aspect 23. The system of any of the preceding or subsequent aspects where the control system is further configured to determine or derive a transformation from the optical fiducial coordinate system to the model coordinate system.

Aspect 24. The system of any of the preceding or subsequent aspects where the fixture has a series of standoffs to support the glass sheet, a first datum to position the glass sheet relative to the fixture, and a second datum to position the glass sheet relative to the fixture.

Aspect 25. A method of using a non-contact optical inspection system is provided. A fixture is provided to support a glass sheet, with the fixture provided with an optical fiducial. The optical fiducial on the fixture is imaged via a camera in an inspection assembly. An optical fiducial coordinate system is defined, via a control system, by analyzing the imaged optical fiducial. A mathematical model of the glass sheet in a model coordinate system is received, via the control system. The optical fiducial coordinate system is related, via the control system, the to the model coordinate system via at least one transformation.

Aspect 26. The method of any of the preceding or subsequent aspects where a planar laser sheet from an ultraviolet laser and associated optics of the inspection assembly is formed and directed to a surface of the glass sheet on the fixture. The surface of the glass sheet is excited at an intersection of the planar laser sheet and the surface to form a visible wavelength line on the surface of the glass sheet. The visible wavelength line is imaged using the camera. First and second coordinates in a series of coordinates associated with the visible wavelength line are determined by analyzing imaging data from the camera. A third coordinate associated with each of the first and second coordinates in the series of coordinates associated with the visible wavelength line is determined by triangulation. A three-dimensional map of the surface of the glass sheet is created as a function of the series of coordinates.

Aspect 27. The method of any of the preceding or subsequent aspects where the three-dimensional map is transformed via the at least one transformation to relate the three-dimensional map to the model coordinate system. An invariant metric is calculated using the three-dimensional map in comparison with a mathematical model for the surface in the model coordinate system. The invariant metric is output.

Aspect 28. The method of any of the preceding or subsequent aspects where the at least one transformation is provided as at least one transformation matrix.

While exemplary embodiments are described above, it is not intended that these embodiments describe all possible forms of the invention and/or disclosure. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An optical inspection system comprising:
a fixture to support a glass sheet, the fixture having an optical fiducial provided thereon;
an ultraviolet laser and associated optics forming a planar laser sheet directed to the glass sheet, wherein the planar laser sheet intersects a surface of the glass sheet thereby causing the surface of the glass sheet to fluoresce and form a visible wavelength line on the surface;
a camera having an image sensor for detecting the optical fiducial and for detecting the visible wavelength line across at least a portion of a width of the sheet; and
a control system configured to (i) image the optical fiducial on the fixture, (ii) define an optical fiducial coordinate system from the imaged optical fiducial, (ii) receive a mathematical model of the glass sheet in a model coordinate system, and (iii) relate the optical fiducial coordinate system to the model coordinate system via at least one transformation.

2. The system of claim 1 wherein the control system is further configured to (i) receive image data indicative of the visible wavelength line from the camera, (ii) analyze the data from the camera to determine first and second coordinates in a series of coordinates associated with the line, (iii) triangulate a third coordinate associated with each of the first and second coordinates in the series of coordinates, and (iv) create a three-dimensional map of the surface of the glass sheet as a function of the series of coordinates.

3. The system of claim 2 wherein the control system is further configured to transform the three-dimensional map via the at least one transformation to relate the three-dimensional map to the model coordinate system.

4. The system of claim 3 wherein the control system is further configured to output a metric indicative of a measurement of the glass sheet in response to comparing the three-dimensional map to the mathematical model in the model coordinate system.

5. The system of claim 4 wherein the control system is further configured to determine the metric as a simulated optical reflectance of the surface using the three-dimensional map of the surface in comparison to the mathematical model in the model coordinate system.

6. The system of claim 4 wherein the control system is further configured to determine the metric to gauge the glass sheet using the three-dimensional map of the surface.

7. The system of claim 4 wherein the control system is further configured to receive a series of data indicative of a series of visible wavelength lines from the camera as measured across the width of the sheet, each line corresponding to a different location along the surface of the glass sheet; and
wherein the control system is further configured to analyze each of the series of visible wavelength lines to determine first and second coordinates in a series of coordinates associated with each line, triangulate a third coordinate associated with each of the first and second coordinates in each of the series of coordinates, and create the three-dimensional map of the surface of the glass sheet from each the series of coordinates.

8. The system of claim 7 wherein a wavelength of the ultraviolet laser is selected to be non-transmissive through the glass sheet.

9. The system of claim 1 wherein the fixture has a first series of physical fiducials, the first series of physical fiducials having at least three coordinates in the model coordinate system.

10. The system of claim 9 wherein the first series of physical fiducials of the fixture is provided by a calibration surface shaped to correspond with at least a portion of the surface of the glass sheet.

11. The system of claim 10 wherein the calibration surface additionally forms an optical fiducial.

12. The system of claim 10 wherein the fixture has at least one optical fiducial, the at least one optical fiducial positioned on the calibration surface.

13. The system of claim 12 wherein the at least one optical fiducial additionally provides at least one physical fiducial.

14. The system of claim 10 wherein the control system is further configured to determine or derive a transformation from the optical fiducial coordinate system to the model coordinate system.

15. The system of claim 9 wherein the fixture has a calibration surface shaped to correspond with at least a portion of the surface of the glass sheet provided by an exemplar glass sheet G0 to provide a first optical fiducial.

16. The system of claim 15 wherein the fixture has a camera optical fiducial associated with each camera.

17. The system of claim 16 wherein the control system is further configured to image the camera optical fiducials to relate the cameras via at least one another transformation, and separately image the calibration surface as the optical fiducial to relate the optical fiducial coordinate system to the model coordinate system via the at least one transformation.

18. The system of claim 9 wherein the control system is configured to determine or receive a transformation relating a fixture physical fiducial coordinate system to the model coordinate system as determined using the first series of physical fiducials from the fixture.

19. The system of claim 9 wherein the optical fiducial also defines a second series of physical fiducials; and
wherein the control system is configured to image the second series of physical fiducials and relate the second series of physical fiducials to the optical fiducial coordinate system.

20. The system of claim 19 wherein the control system is configured to determine or receive a transformation relating the fixture physical fiducial coordinate system to a physical fiducial coordinate system of the optical fiducial as determined using the first series of physical fiducials from the fixture and the second series of physical fiducials from the optical fiducial.

21. The system of claim 19 wherein the control system is further configured to determine or receive a transformation relating the fixture physical fiducial coordinate system to the second series of physical fiducials.

22. The system of claim 21 wherein the control system is further configured to determine or derive a transformation from the model coordinate system to the second series of physical fiducials.

23. The system of claim 22 wherein the control system is further configured to determine or derive a transformation from the optical fiducial coordinate system to the model coordinate system.

24. The system of claim 1 wherein the fixture has a series of standoffs to support the glass sheet, a first datum to position the glass sheet relative to the fixture, and a second datum to position the glass sheet relative to the fixture.

25. A method of using a non-contact optical inspection system comprising:
providing a fixture to support a glass sheet, the fixture provided with an optical fiducial;
imaging the optical fiducial on the fixture via a camera in an inspection assembly;
defining, via a control system, an optical fiducial coordinate system by analyzing the imaged optical fiducial;
receiving, via the control system, a mathematical model of the glass sheet in a model coordinate system; and
relating, via the control system, the optical fiducial coordinate system to the model coordinate system via at least one transformation.

26. The method of claim 25 further comprising:
forming and directing a planar laser sheet from an ultraviolet laser and associated optics of the inspection assembly to a surface of the glass sheet on the fixture;
exciting the surface of the glass sheet at an intersection of the planar laser sheet and the surface to form a visible wavelength line on the surface of the glass sheet;
imaging the visible wavelength line using the camera;
determining first and second coordinates in a series of coordinates associated with the visible wavelength line by analyzing imaging data from the camera;
determining a third coordinate associated with each of the first and second coordinates in the series of coordinates associated with the visible wavelength line by triangulation; and
creating a three-dimensional map of the surface of the glass sheet as a function of the series of coordinates.

27. The method of claim 26 further comprising:
transforming the three-dimensional map via the at least one transformation to relate the three-dimensional map to the model coordinate system;
calculating an invariant metric using the three-dimensional map in comparison with a mathematical model for the surface in the model coordinate system; and
outputting the invariant metric.

28. The method of claim 27 wherein the at least one transformation is provided as at least one transformation matrix.

* * * * *